:::

(12) United States Patent
Zhang et al.

(10) Patent No.: US 12,355,561 B2
(45) Date of Patent: Jul. 8, 2025

(54) USER EQUIPMENT (UE)-TO-UE CROSS LINK INTERFERENCE REPORTING

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/050,844

(22) Filed: Oct. 28, 2022

(65) Prior Publication Data

US 2024/0146446 A1 May 2, 2024

(51) Int. Cl.
*H04L 1/00* (2006.01)
*H04B 17/345* (2015.01)
*H04L 5/00* (2006.01)

(52) U.S. Cl.
CPC ......... *H04L 1/0026* (2013.01); *H04B 17/345* (2015.01); *H04L 5/0051* (2013.01)

(58) Field of Classification Search
CPC .... H04L 1/0026; H04L 5/0051; H04B 17/345
See application file for complete search history.

(56) References Cited

U.S. PATENT DOCUMENTS

| | | | |
|---|---|---|---|
| 2016/0241324 A1 | 8/2016 | Blankenship et al. | |
| 2020/0112420 A1* | 4/2020 | Xu | H04L 5/0073 |
| 2020/0229009 A1 | 7/2020 | Xu et al. | |
| 2021/0084655 A1* | 3/2021 | Estevez | H04B 7/0626 |
| 2022/0006501 A1* | 1/2022 | Kim | H04W 24/10 |
| 2022/0014954 A1 | 1/2022 | Ibrahim et al. | |
| 2022/0103333 A1* | 3/2022 | Ghozlan | H04W 88/08 |
| 2022/0116129 A1* | 4/2022 | Ying | H04B 7/0617 |
| 2022/0123847 A1* | 4/2022 | Ghozlan | H04B 17/318 |
| 2022/0124531 A1* | 4/2022 | Miao | H04B 17/345 |
| 2022/0159580 A1* | 5/2022 | Su | H04L 5/14 |
| 2022/0159596 A1* | 5/2022 | Kim | H04J 11/00 |
| 2022/0329462 A1* | 10/2022 | Kang | H04L 5/0051 |
| 2023/0007641 A1* | 1/2023 | Kim | H04W 72/044 |
| 2023/0101464 A1* | 3/2023 | Fakoorian | H04L 27/2607 370/280 |

(Continued)

FOREIGN PATENT DOCUMENTS

WO 2022056822 A1 3/2022

OTHER PUBLICATIONS

International Search Report and Written Opinion—PCT/US2023/075430—ISA/EPO—Feb. 7, 2024.

(Continued)

*Primary Examiner* — Fahmida S Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may measure a characteristic of a UE-to-UE cross link interference (CLI) reference signal in an uplink sub-band (SB) of a network node sub-band full-duplex (SBFD) symbol. The UE may transmit a report including information associated with the characteristic of the UE-to-UE CLI reference signal in the uplink SB. Numerous other aspects are described.

30 Claims, 14 Drawing Sheets

(56) References Cited

U.S. PATENT DOCUMENTS

| | | | | |
|---|---|---|---|---|
| 2023/0254894 A1* | 8/2023 | Rosa | ...................... | H04W 16/14 |
| | | | | 370/329 |
| 2023/0319605 A1* | 10/2023 | Park | ......................... | H04L 5/00 |
| | | | | 370/252 |
| 2024/0063992 A1* | 2/2024 | Esswie | .............. | H04W 72/1273 |
| 2024/0064539 A1* | 2/2024 | Esswie | ................. | H04W 24/10 |
| 2024/0223343 A1* | 7/2024 | Fakoorian | ............. | H04L 5/0055 |

OTHER PUBLICATIONS

Moderator (LG Electronics): "Summary #3 of Potential Enhancement on Dynamic/Flexible TDD", 3GPP TSG RAN WG1 #110bis-e, R1-2210405, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Oct. 20, 2022, 101 Pages, XP052259872, Section 3.1, p. 63.

* cited by examiner

USER EQUIPMENT (UE)-TO-UE CROSS LINK INTERFERENCE REPORTING

FIELD OF THE DISCLOSURE

Aspects of the present disclosure generally relate to wireless communication and to techniques and apparatuses for user equipment (UE)-to-UE cross link interference (CLI) reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include measuring a characteristic of a UE-to-UE cross link interference (CLI) reference signal in an uplink sub-band (SB) of a network node sub-band full-duplex (SBFD) symbol. The method may include transmitting a report including information associated with the characteristic of the UE-to-UE CLI reference signal in the uplink SB.

Some aspects described herein relate to a method of wireless communication performed by an apparatus of a UE. The method may include measuring a characteristic of a UE-to-UE CLI reference signal in a first plurality of sub-sub-bands (sub-SBs) of a symbol, the first plurality of sub-SBs being included in a first SB of the symbol. The method may include transmitting a report including information associated with the characteristic of the UE-to-UE CLI reference signal in the first plurality of sub-SBs.

Some aspects described herein relate to a method of wireless communication performed by an apparatus of a network node. The method may include transmitting, to a UE, a configuration associated with measuring or reporting a characteristic of a UE-to-UE CLI reference signal in an uplink SB of a network node SBFD symbol. The method may include receiving, from the UE, a report including information associated with the characteristic of the UE-to-UE CLI reference signal in the uplink SB.

Some aspects described herein relate to a method of wireless communication performed by an apparatus of a network node. The method may include transmitting, to a UE, a configuration associated with measuring or reporting a characteristic of a UE-to-UE CLI reference signal in a first plurality of sub-SBs of a symbol, the first plurality of sub-SBs being included in a first SB of the symbol. The method may include receiving a report including information associated with the characteristic of the UE-to-UE CLI reference signal in the first plurality of sub-SBs.

Some aspects described herein relate to a UE for wireless communication. The UE may include a memory and one or more processors coupled to the memory. The one or more processors may be configured to measure a characteristic of a UE-to-UE CLI reference signal in an uplink SB of a network node SBFD symbol. The one or more processors may be configured to transmit a report including information associated with the characteristic of the UE-to-UE CLI reference signal in the uplink SB.

Some aspects described herein relate to a UE for wireless communication. The UE may include a memory and one or more processors coupled to the memory. The one or more processors may be configured to measure a characteristic of a UE-to-UE CLI reference signal in a first plurality of sub-SBs of a symbol, the first plurality of sub-SBs being included in a first SB of the symbol. The one or more processors may be configured to transmit a report including information associated with the characteristic of the UE-to-UE CLI reference signal in the first plurality of sub-SBs.

Some aspects described herein relate to a network node for wireless communication. The network node may include a memory and one or more processors coupled to the memory. The one or more processors may be configured to transmit, to a UE, a configuration associated with measuring or reporting a characteristic of a UE-to-UE CLI reference signal in an uplink SB of a network node SBFD symbol. The one or more processors may be configured to receive, from the UE, a report including information associated with the characteristic of the UE-to-UE CLI reference signal in the uplink SB.

Some aspects described herein relate to a network node for wireless communication. The network node may include a memory and one or more processors coupled to the memory. The one or more processors may be configured to transmit, to a UE, a configuration associated with measuring or reporting a characteristic of a UE-to-UE CLI reference signal in a first plurality of sub-SBs of a symbol, the first plurality of sub-SBs being included in a first SB of the symbol. The one or more processors may be configured to receive a report including information associated with the characteristic of the UE-to-UE CLI reference signal in the first plurality of sub-SBs.

Some aspects described herein relate to a non-transitory computer-readable medium that stores a set of instructions for wireless communication by a UE. The set of instructions, when executed by one or more processors of the UE, may cause the UE to measure a characteristic of a UE-to-UE CLI reference signal in an uplink SB of a network node SBFD symbol. The set of instructions, when executed by one or more processors of the UE, may cause the UE to transmit a report including information associated with the characteristic of the UE-to-UE CLI reference signal in the uplink SB.

Some aspects described herein relate to a non-transitory computer-readable medium that stores a set of instructions for wireless communication by a UE. The set of instructions, when executed by one or more processors of the UE, may cause the UE to measure a characteristic of a UE-to-UE CLI reference signal in a first plurality of sub-SBs of a symbol, the first plurality of sub-SBs being included in a first SB of the symbol. The set of instructions, when executed by one or more processors of the UE, may cause the UE to transmit a report including information associated with the characteristic of the UE-to-UE CLI reference signal in the first plurality of sub-SBs.

Some aspects described herein relate to a non-transitory computer-readable medium that stores a set of instructions for wireless communication by a network node. The set of instructions, when executed by one or more processors of the network node, may cause the network node to transmit, to a UE, a configuration associated with measuring or reporting a characteristic of a UE-to-UE CLI reference signal in an uplink SB of a network node SBFD symbol. The set of instructions, when executed by one or more processors of the network node, may cause the network node to receive, from the UE, a report including information associated with the characteristic of the UE-to-UE CLI reference signal in the uplink SB.

Some aspects described herein relate to a non-transitory computer-readable medium that stores a set of instructions for wireless communication by a network node. The set of instructions, when executed by one or more processors of the network node, may cause the network node to transmit, to a UE, a configuration associated with measuring or reporting a characteristic of a UE-to-UE CLI reference signal in a first plurality of sub-SBs of a symbol, the first plurality of sub-SBs being included in a first SB of the symbol. The set of instructions, when executed by one or more processors of the network node, may cause the network node to receive a report including information associated with the characteristic of the UE-to-UE CLI reference signal in the first plurality of sub-SBs.

Some aspects described herein relate to an apparatus for wireless communication. The apparatus may include means for measuring a characteristic of a UE-to-UE CLI reference signal in an uplink SB of a network node SBFD symbol. The apparatus may include means for transmitting a report including information associated with the characteristic of the UE-to-UE CLI reference signal in the uplink SB.

Some aspects described herein relate to an apparatus for wireless communication. The apparatus may include means for measuring a characteristic of a UE-to-UE CLI reference signal in a first plurality of sub-SBs of a symbol, the first plurality of sub-SBs being included in a first SB of the symbol. The apparatus may include means for transmitting a report including information associated with the characteristic of the UE-to-UE CLI reference signal in the first plurality of sub-SBs.

Some aspects described herein relate to an apparatus for wireless communication. The apparatus may include means for transmitting, to a UE, a configuration associated with measuring or reporting a characteristic of a UE-to-UE CLI reference signal in an uplink SB of a network node SBFD symbol. The apparatus may include means for receiving, from the UE, a report including information associated with the characteristic of the UE-to-UE CLI reference signal in the uplink SB.

Some aspects described herein relate to an apparatus for wireless communication. The apparatus may include means for transmitting, to a UE, a configuration associated with measuring or reporting a characteristic of a UE-to-UE CLI reference signal in a first plurality of sub-SBs of a symbol, the first plurality of sub-SBs being included in a first SB of the symbol. The apparatus may include means for receiving a report including information associated with the characteristic of the UE-to-UE CLI reference signal in the first plurality of sub-SBs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
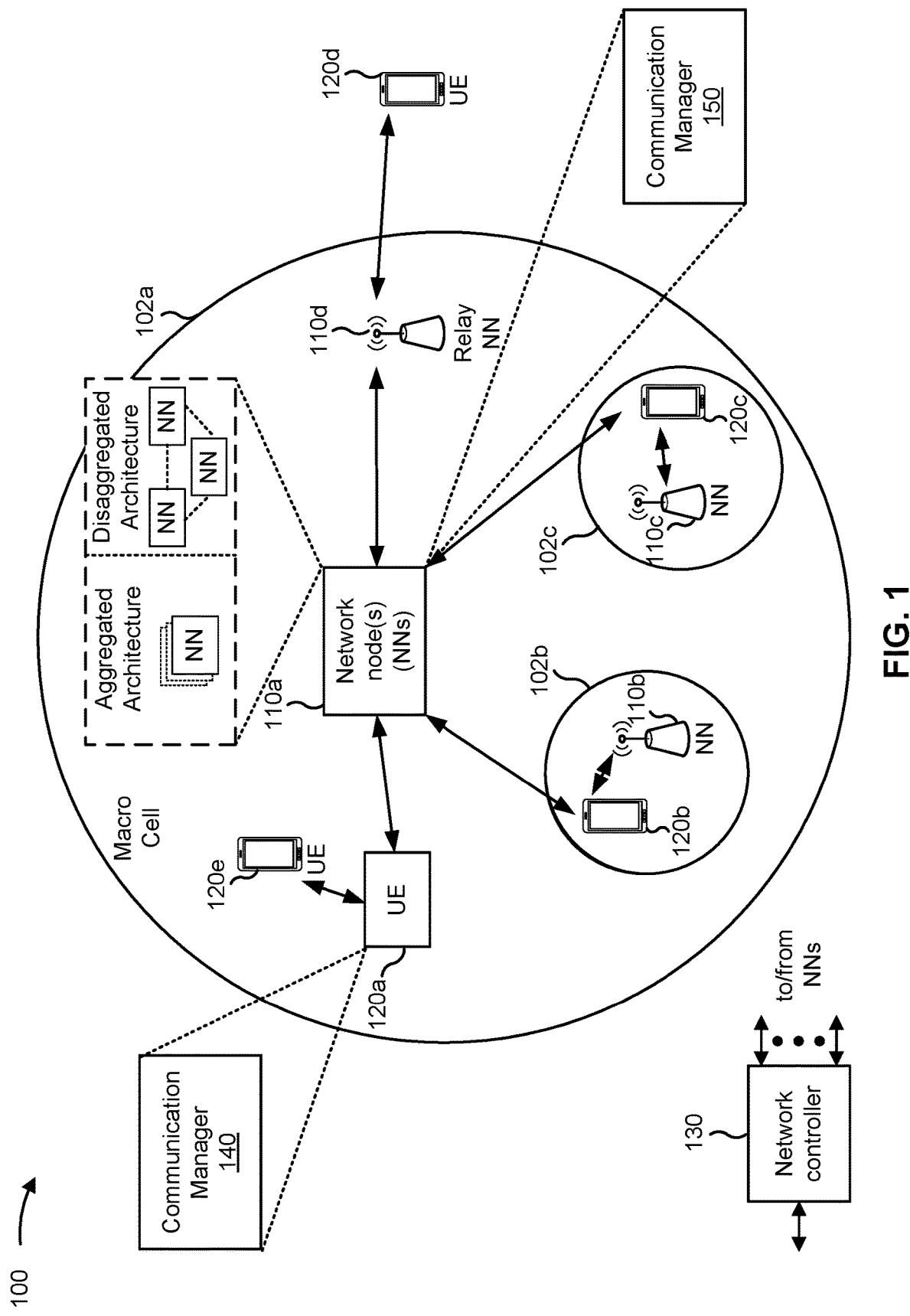
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may measure a characteristic of a UE-to-UE cross link interference (CLI) reference signal in an uplink sub-band (SB) of a network node sub-band full-duplex (SBFD) symbol; and transmit a report including information associated with the characteristic of the UE-to-UE CLI reference signal in the uplink SB. Additionally, or alternatively, the communication manager 140 may perform one or more other operations described herein.

In some aspects, the UE 120 may include a communication manager 140. As described in more detail elsewhere herein, the communication manager 140 may measure a characteristic of a UE-to-UE CLI reference signal in a first plurality of sub-sub-bands (sub-SBs) of a symbol, the first plurality of sub-SBs being included in a first SB of the symbol; and transmit a report including information associated with the characteristic of the UE-to-UE CLI reference signal in the first plurality of sub-SBs. Additionally, or alternatively, the communication manager 140 may perform one or more other operations described herein.

In some aspects, the network node 110 may include a communication manager 150. As described in more detail elsewhere herein, the communication manager 150 may transmit, to a UE 120, a configuration associated with measuring or reporting a characteristic of a UE-to-UE CLI reference signal in an uplink SB of a network node SBFD symbol; and receive, from the UE, a report including information associated with the characteristic of the UE-to-UE CLI reference signal in the uplink SB. Additionally, or alternatively, the communication manager 150 may perform one or more other operations described herein.

In some aspects, the network node 110 may include a communication manager 150. As described in more detail elsewhere herein, the communication manager 150 may transmit, to a UE 120, a configuration associated with measuring or reporting a characteristic of a UE-to-UE CLI reference signal in a first plurality of sub-SBs of a symbol, the first plurality of sub-SBs being included in a first SB of the symbol; and receive a report including information associated with the characteristic of the UE-to-UE CLI reference signal in the first plurality of sub-SBs. Additionally, or alternatively, the communication manager 150 may perform one or more other operations described herein.

As indicated above, FIG. 1 is provided as an example. Other examples may differ from what is described with regard to FIG. 1.

Figure 2:
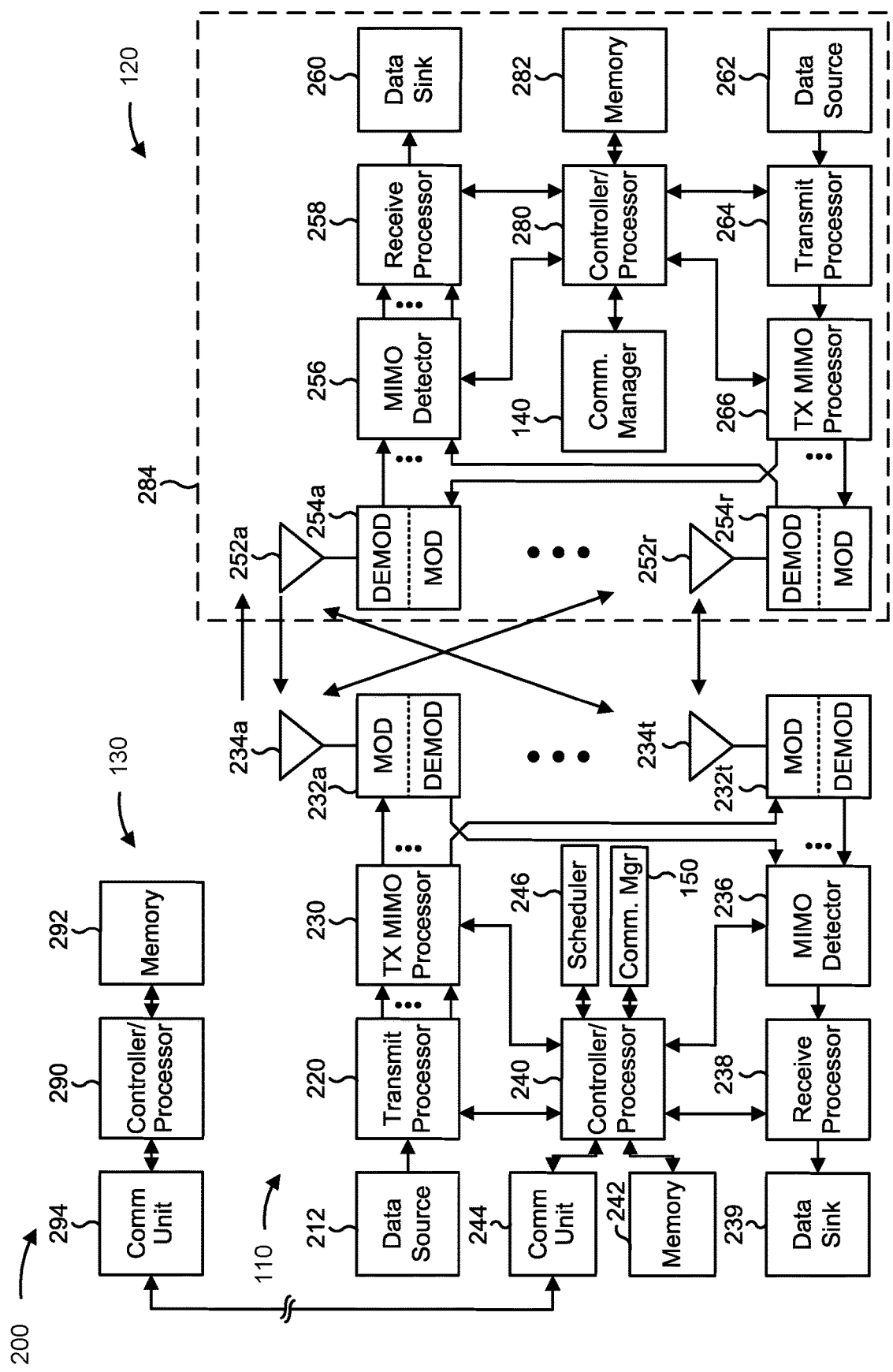
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the network node 110, the controller/processor 280 of the UE 120, and/or any other component(s) of FIG. 2 may perform one or more techniques associated with cross link interference (CLI) reporting, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for measuring a characteristic of a UE-to-UE CLI reference signal in an uplink SB of a network node SBFD symbol; and/or means for transmitting a report including information associated with the characteristic of the UE-to-UE CLI reference signal in the uplink SB. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for measuring a characteristic of a UE-to-UE CLI reference signal in a first plurality of sub-SBs of a symbol, the first plurality of sub-SBs being included in a first SB of the symbol; and/or means for transmitting a report including information associated with the characteristic of the UE-to-UE CLI reference signal in the first plurality of sub-SBs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE 120, a configuration associated with measuring or reporting a characteristic of a UE-to-UE CLI reference signal in an uplink SB of a network node SBFD symbol; and/or means for receiving, from the UE, a report including information associated with the characteristic of the UE-to-UE CLI reference signal in the uplink SB. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node 110 includes means for transmitting, to a UE 120, a configuration associated with measuring or reporting a characteristic of a UE-to-UE CLI reference signal in a first plurality of sub-SBs of a symbol, the first plurality of sub-SBs being included in a first SB of the symbol; and/or means for receiving a report including information associated with the characteristic of the UE-to-UE CLI reference signal in the first plurality of sub-SBs. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
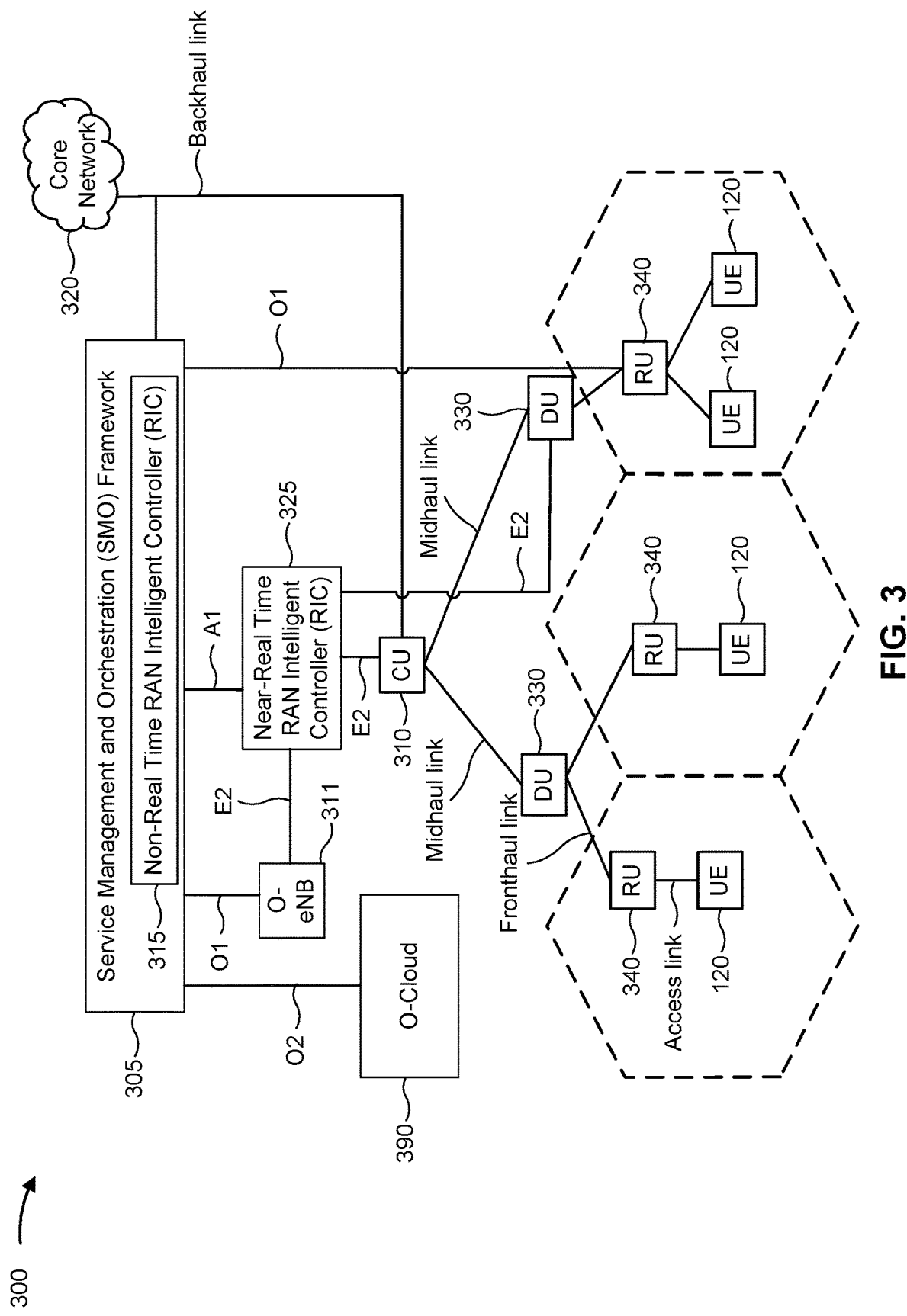
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
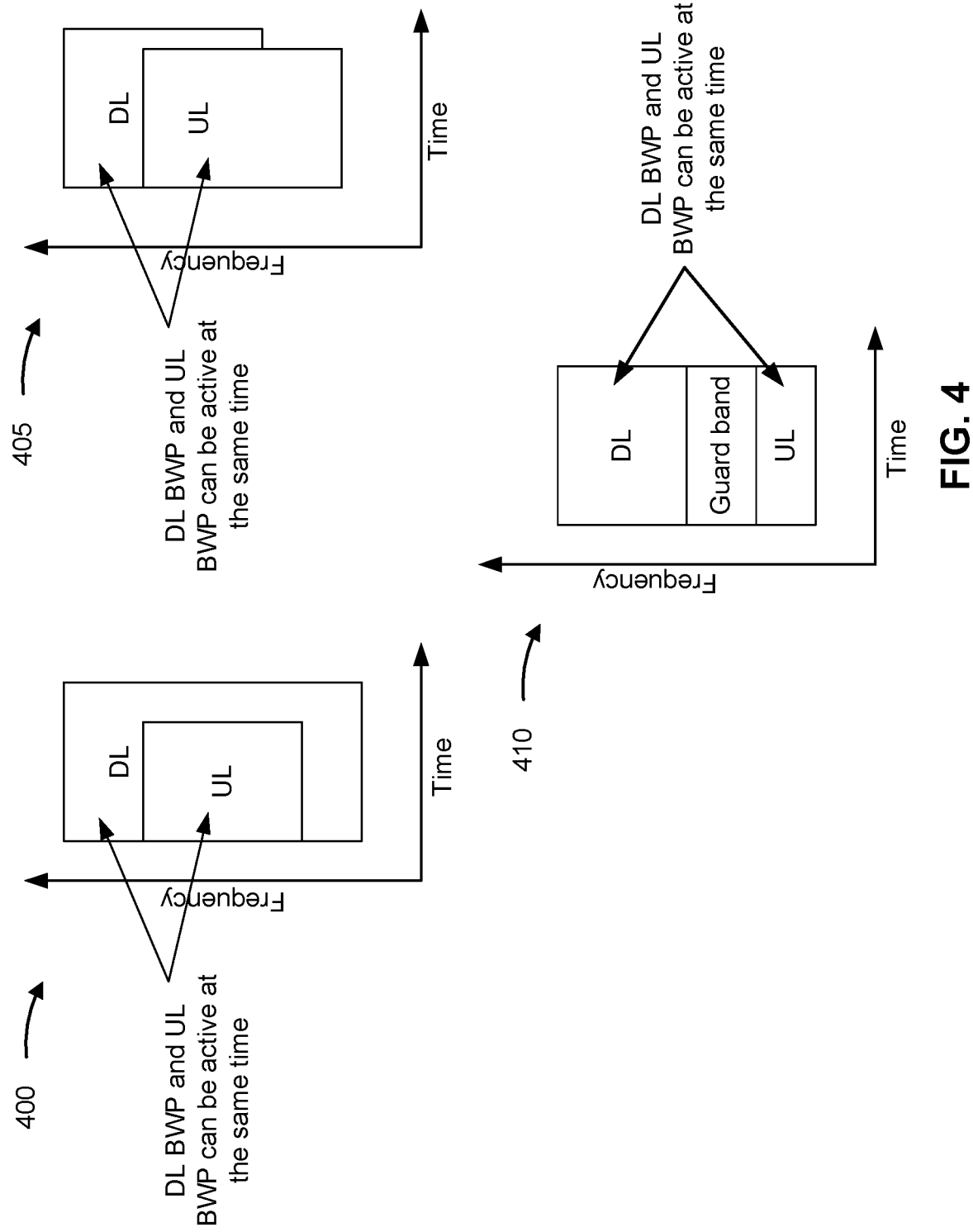
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

In some implementations, the techniques and apparatuses associated with UE-to-UE CLI reporting described herein may be implemented for full-duplex communication (e.g., SBFD communication) as described with respect to FIG. 4.

As indicated above, FIG. 4 is provided as an example. Other examples may differ from what is described with respect to FIG. 4.

Figure 5:
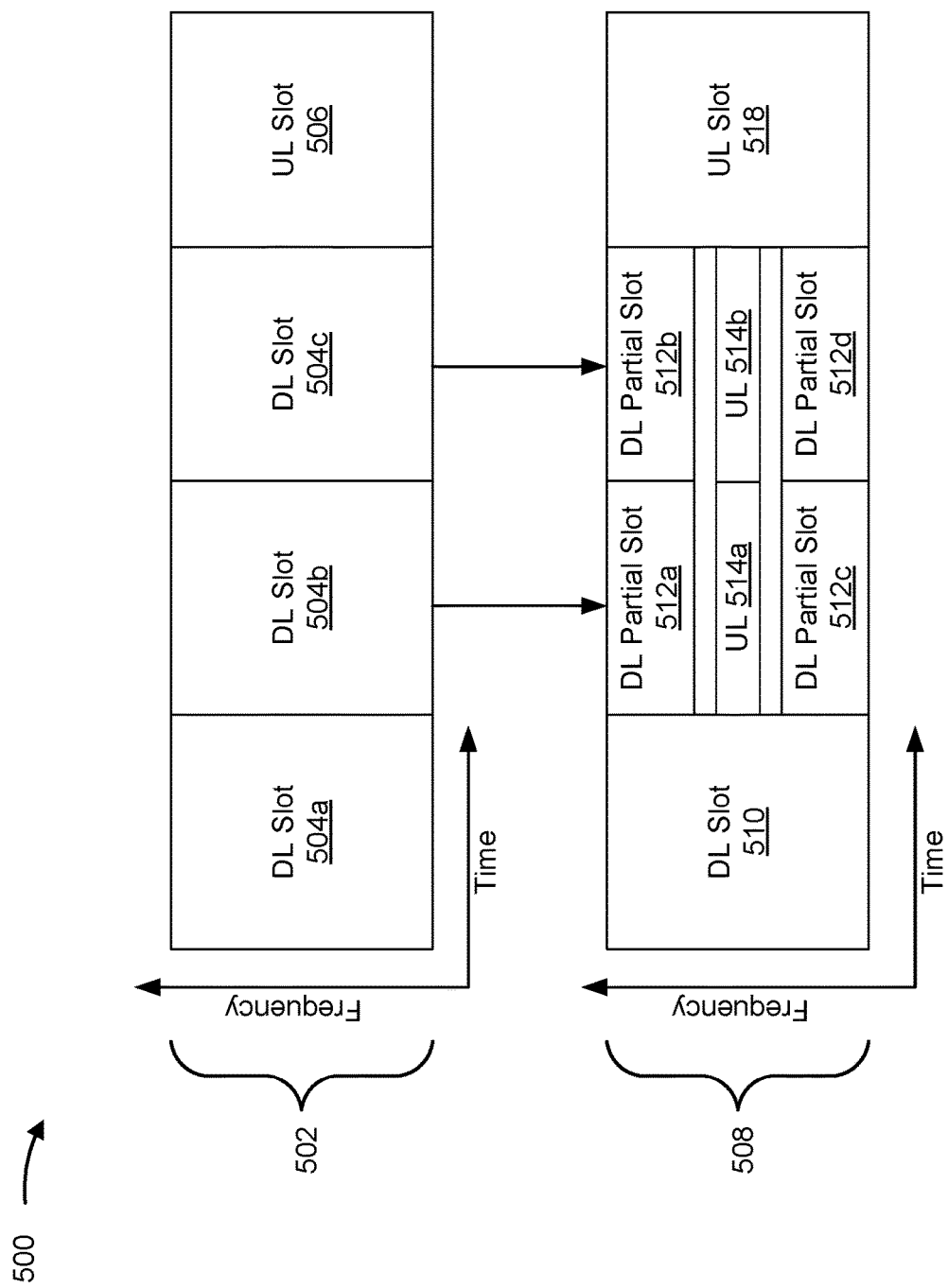
FIG. 5 is a diagram illustrating an example of sub-band full-duplex (SBFD) activation, in accordance with the present disclosure.

FIG. 5 is a diagram illustrating an example 500 of SBFD activation, in accordance with the present disclosure. As shown in FIG. 5, example 500 includes a first configuration 502. In some aspects, the first configuration 502 may indicate a first slot format pattern (sometimes called a TDD pattern) associated with a half-duplex mode or a full-duplex mode. The first slot format pattern may include a quantity of downlink slots (e.g., three downlink slots 504a, 504b, and 504c, as shown), a quantity of flexible slots (not shown), and/or a quantity of uplink slots (e.g., one uplink slot 506, as shown). The first slot format pattern may repeat over time. In some aspects, a network node 110 may indicate the first slot format pattern to a UE 120 using one or more slot format indicators. A slot format indicator, for a slot, may indicate whether that slot is an uplink slot, a downlink slot, or a flexible slot, among other examples.

A network node 110 may instruct (e.g., using an indication, such as a radio resource control (RRC) message, a medium access control (MAC) control element (CE) (MAC-CE), or downlink control information (DCI)) a UE 120 to switch from the first configuration 502 to a second configuration 508. As an alternative, the UE 120 may indicate to the network node 110 that the UE 120 is switching from the first configuration 502 to the second configuration 508. The second configuration 508 may indicate a second slot format pattern that repeats over time, similar to the first slot format pattern. In any of the aspects described above, the UE 120 may switch from the first configuration 502 to the second configuration 508 during a time period (e.g., a quantity of symbols and/or an amount of time (e.g., in ms)) based at least in part on an indication received from the network node 110 (e.g., before switching back to the first configuration 502). During that time period, the UE 120 may communicate using the second slot format pattern, and then may revert to using the first slot format pattern after the end of the time period. The time period may be indicated by the network node 110 (e.g., in the instruction to switch from the first configuration 502 to the second configuration 508, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologies (e.g., represented by µ and associated with corresponding SCSs) with corresponding time periods for switching configurations.

In example 500, the second slot format pattern includes two SBFD slots in place of what were downlink slots in the first slot format pattern. In example 500, each SBFD slot includes a partial slot (e.g., a portion or sub-band of a frequency allocated for use by the network node 110 and the UE 120) for downlink (e.g., partial slots 512a, 512b, 512c, and 512d, as shown) and a partial slot for uplink (e.g., partial slots 514a and 514b, as shown). Accordingly, the UE 120 may operate using the second slot format pattern to transmit an uplink communication in an earlier slot (e.g., the second slot in sequence, shown as partial UL slot 514a) as compared to using the first slot format pattern (e.g., the fourth slot in sequence, shown as UL slot 506). Other examples may include additional or alternative changes. For example, the second configuration 508 may indicate an SBFD slot in place of what was an uplink slot in the first configuration 502 (e.g., UL slot 506). In another example, the second configuration 508 may indicate a downlink slot or an uplink slot in place of what was an SBFD slot in the first configuration 502 (not shown in FIG. 5). In yet another example, the second configuration 508 may indicate a downlink slot or an uplink slot in place of what was an uplink slot or a downlink slot, respectively, in the first configuration 502. An "SBFD slot" may refer to a slot in which an SBFD format is used. An SBFD format may include a slot format in which full duplex communication is supported (e.g., for both uplink and downlink communications), with one or more frequencies used for an uplink portion of the slot being separated from one or more frequencies used for a downlink portion of the slot by a guard band. In some aspects, the SBFD format may include a single uplink portion and a single downlink portion separated by a guard band. In some aspects, the SBFD format may include multiple downlink portions and a single uplink portion that is separated from the multiple downlink portions by respective guard bands (e.g., as shown in FIG. 5). In some aspects, an SBFD format may include multiple uplink portions and a single downlink portion that is separated from the multiple uplink portions by respective guard bands. In some aspects, the SBFD format may include multiple uplink portions and multiple downlink portions, where each uplink portion is separated from a downlink portion by a guard band. In some aspects, operating using an SBFD mode may include activating or using an FD mode in one or more slots based at least in part on the one or more slots having the SBFD format. A slot may support the SBFD mode if an UL BWP and a DL BWP are permitted to be or are simultaneously active in the slot in an SBFD fashion (e.g., with guard band separation).

By switching from the first configuration 502 to the second configuration 508, the network node 110 and the UE 120 may experience increased quality and/or reliability of communications. For example, the network node 110 and the UE 120 may experience increased throughput (e.g., using a full-duplex mode), reduced latency (e.g., the UE 120 may be able to transmit an uplink and/or a downlink communication sooner using the second configuration 508 rather than the first configuration 502), and increased network resource utilization (e.g., by using both the DL BWP and the UL BWP simultaneously instead of only the DL BWP or the UL BWP).

In some implementations, the techniques and apparatuses associated with UE-to-UE CLI reporting described herein may be implemented in an SBFD slot as described with respect to FIG. 5.

As indicated above, FIG. 5 is provided as an example. Other examples may differ from what is described with respect to FIG. 5.

Figure 6:
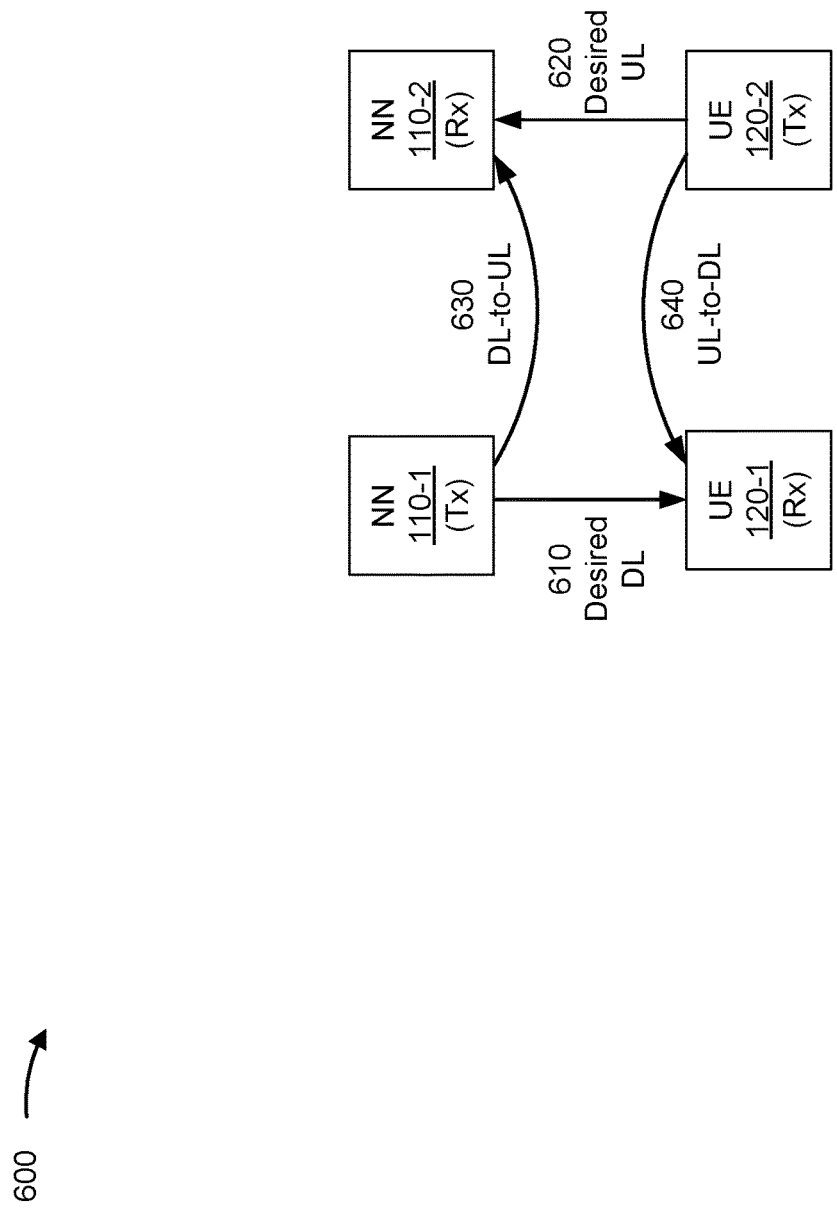
FIG. 6 is a diagram illustrating an example relating to cross link interference (CLI), in accordance with the present disclosure.

FIG. 6 is a diagram illustrating an example 600 relating to cross link interference (CLI), in accordance with the present disclosure.

As shown in FIG. 6, when neighboring network nodes 110 use SBFD configurations or different time division duplexing (TDD) configurations (e.g., when dynamic TDD or flexible TDD is implemented) to communicate with UEs 120, this may result in a downlink communication 610 between a first network node 110-1 and a first UE 120-1 in a same transmission time interval (TTI) as an uplink communication 620 between a second network node 110-2 and a second UE 120-2. These communications in different transmission directions (e.g., downlink versus uplink) in the same TTI may interfere with one another, which may be referred to as cross-link interference.

For example, as shown by reference number 630, the downlink communication 610 transmitted by the first network node 110-1 may be received by the second network node 110-2, and may interfere with reception, by the second network node 110-2, of the uplink communication 620 from the second UE 120-2. This may be referred to as downlink-to-uplink (DL-to-UL) interference, network-node-to-network-node interference, or gNB-to-gNB interference.

Further, as shown by reference number 640, the uplink communication 620 transmitted by the second UE 120-2 may be received by the first UE 120-1, and may interfere with reception, by the first UE 120-1, of the downlink communication 610 from the first network node 110-1. This may be referred to as uplink-to-downlink (UL-to-DL) interference or UE-to-UE interference. This UE-to-UE interference may occur and/or may increase when the first UE 120-1 and the second UE 120-2 are in close proximity.

In some implementations, the techniques and apparatuses associated with UE-to-UE CLI reporting described herein may be implemented in association with measuring and reporting UE-to-UE CLI as described with respect to FIG. 6.

As indicated above, FIG. 6 is provided as an example. Other examples are possible and may differ from what was described with respect to FIG. 6.

A wireless communication system may support SBFD communication or dynamic TDD communication. However, as described above, UE-to-UE CLI (also referred to as inter-UE CLI) may occur during such communications.

For example, in an SBFD scenario, transmission of an uplink communication on an uplink sub-band (SB) in an SBFD symbol by a first UE in a cell may interfere with reception of a downlink communication on a downlink SB in the SBFD symbol by a second UE in the cell. Such interference may be referred to as inter-SB intra-cell inter-UE CLI. As another example, in an SBFD scenario, transmission of an uplink communication on an uplink SB in an SBFD symbol by a first UE in a first cell may interfere with reception of a downlink communication on a downlink SB in the SBFD symbol by a second UE in a second cell. Such interference may be referred to as inter-SB inter-cell inter-UE CLI.

As another example, in a dynamic TDD scenario, transmission of an uplink communication in a symbol by a first UE in a first cell may interfere with reception of a downlink communication in the symbol by a second UE in a second cell. Such interference may be referred to as inter-cell inter-UE CLI.

Performance and reliability of SBFD communication or dynamic TDD communication could be improved by the network if information associated with UE-to-UE CLI was available to the network.

Some techniques and apparatuses described herein enable UE-to-UE CLI reporting. In some implementations, a network node may transmit, and a UE may receive, a configuration associated with measuring or reporting a characteristic of a UE-to-UE CLI reference signal in an uplink SB of a network node SBFD symbol. The UE may measure the characteristic of the UE-to-UE CLI reference signal in the SB of the network node SBFD symbol (e.g., according to the configuration). The UE may then transmit, and the network node may receive, a report including information associated with the characteristic of the UE-to-UE CLI reference signal in the uplink SB (e.g., according to the configuration). In some implementations, a network node may transmit, and a UE may receive, a configuration associated with measuring or reporting a characteristic of a UE-to-UE CLI reference signal in a plurality of sub-SBs of a symbol, the plurality of sub-SBs being included in an SB of the symbol. The UE may measure the characteristic of the UE-to-UE CLI reference signal in the plurality of sub-SBs of the symbol (e.g., according to the configuration). The UE may then transmit, and the network node may receive, a report including information associated with the characteristic of the UE-to-UE CLI reference signal in the plurality of sub-SBs.

In this way, a UE may determine and report information associated with UE-to-UE CLI, thereby providing information associated with UE-to-UE to the network in order to enable the network to adjust or control SBFD communication or dynamic TDD communication so as to improve performance or reliability. Additional details are provided below.

Figure 7:
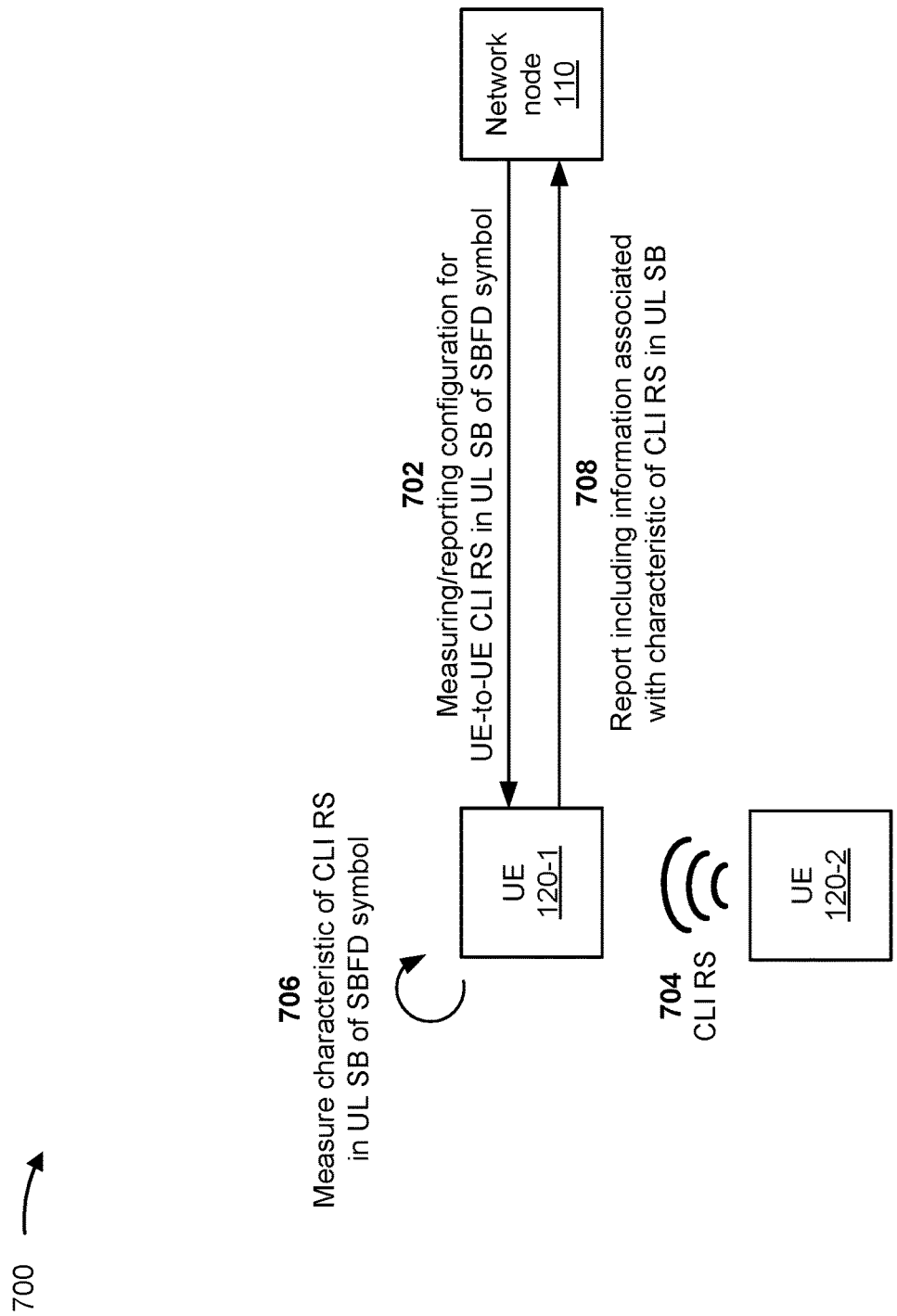
FIGS. 7 and 8 are diagram illustrating examples associated with UE-to-UE CLI reporting, in accordance with the present disclosure.

FIG. 7 is a diagram illustrating an example 700 associated with UE-to-UE CLI reporting, in accordance with the present disclosure. As shown in FIG. 7, example 700 includes communication between a network node 110, a UE 120-1, and a UE 120-2. In some aspects, the network node 110, the UE 120-1, and the UE 120-2 may be included in a wireless network, such as a wireless network 100. In some implementations, the network node 110 and the UE 120-1 may communicate via a wireless access link, which may include an uplink and a downlink.

As shown by reference 702, the network node 110 may transmit, and the UE 120-1 may receive, a configuration associated with measuring or reporting a characteristic of a UE-to-UE CLI reference signal in an uplink SB of a network node SBFD symbol. A network node SBFD symbol is a symbol configured to enable the network node 110 to simultaneously transmit and receive communications with multiple UEs 120 in different SBs. For example, a network node SBFD symbol may be a symbol configured to include an uplink SB and a downlink SB that are separated by a guard band. Here, the network node 110 can simultaneously receive an uplink communication from a first UE 120 in the uplink SB and transmit a downlink communication to a second UE 120 in the downlink SB. In this example, the first UE 120 and/or the second UE 120 may be half-duplex UEs, and so SBFD operation is supported on the network-side (rather than the UE-side).

In some implementations, the configuration includes information based at least in part on the UE 120-1 is to measure a characteristic of a UE-to-UE CLI reference signal or report information associated with the measured characteristic of the UE-to-UE CLI reference signal. For example, the configuration may indicate the characteristic that is to be measured by the UE 120-1. The characteristic may be, for example, a reference signal received power (RSRP) or a received signal strength indicator (RSSI), among other examples. As another example, the configuration may indicate the uplink SB in which the characteristic is to be measured. As another example, the configuration may indicate the SBFD symbol in which the characteristic is to be measured. As another example, the configuration may indicate a set of resources (e.g., one or more uplink SBs, one or more SBFD symbols) in which the UE 120-1 can expect the UE-to-UE CLI reference signal to receive the UE-to-UE CLI reference signal.

As shown by reference 704, the UE 120-2 may transmit the UE-to-UE CLI reference signal. In some implementations, the UE-to-UE CLI reference signal may be, for example, a sounding reference signal (SRS) or another type of signal transmitted on the uplink by the UE 120-2. In some implementations, the UE 120-2 may transmit the UE-to-UE CLI reference signal based at least in part on a configuration from the network node 110. For example, the network node 110 may transmit, and the UE 120-2 may receive, a configuration that indicates a set of resources (e.g., one or more SBs, one or more symbols) in which the UE 120-2 is to transmit the UE-to-UE CLI reference signal, and the UE 120-2 may transmit the UE-to-UE CLI reference signal in the indicated set of resources.

As shown by reference 706, the UE 120-1 may measure the characteristic of the UE-to-UE CLI reference signal in the uplink SB of the network node SBFD symbol. In some implementations, the UE 120-1 measures the characteristic of the UE-to-UE CLI reference signal in the uplink SB in association with detecting intra-SB CLI that affects a dynamic range of a receiver or causes automatic gain control (AGC) blocking of the receiver. That is, in some implementations, the UE 120-1 measures the characteristic of the UE-to-UE CLI reference signal in association with detecting whether a blocker is present in the uplink SB.

In some implementations, the UE 120-1 measures the characteristic of the UE-to-UE CLI reference signal with a subcarrier spacing (SCS) configured for the uplink SB including a UE-to-UE CLI reference signal resource on the network node SBFD symbol. In some implementations, in association with measuring the characteristic of the UE-to-UE CLI reference signal, the UE is not expected to measure the characteristic with an SCS other than an SCS configured for the uplink SB including a UE-to-UE CLI reference signal resource on the network node SBFD symbol. For example, the UE-to-UE CLI reference signal may be an SRS and the characteristic may be an RSRP (e.g., an SRS-RSRP). Here, in association with measuring the SRS-RSRP, the UE 120-1 in some implementations is not expected to measure the SRS-RSRP with an SCS other than the one configured for the uplink SB confining the SRS resource on the SBFD symbol.

In some implementations, the UE 120-1 measures the characteristic of the UE-to-UE CLI reference signal using a measurement resource that is confined within the uplink SB on the network node SBFD symbol. In some implementations, in association with measuring the characteristic of the UE-to-UE CLI reference signal, the UE is not expected to measure the characteristic of the UE-to-UE CLI reference signal using a measurement resource that is not confined within the uplink SB on the network node SBFD symbol. For example, the UE-to-UE CLI reference signal may be an SRS and the characteristic may be an RSRP (e.g., an SRS-RSRP). Here, in association with measuring the SRS-RSRP, the UE 120-1 in some implementations is not expected to measure the SRS-RSRP using an SRS-RSRP measurement resource which is not fully confined within the uplink subband on the SBFD symbol.

In some implementations, when measuring the characteristic of the UE-to-UE CLI reference signal in the uplink SB of the network node SBFD, the UE 120 may measure the characteristic of the UE-to-UE CLI reference signal in a plurality of sub-SBs of the uplink SB. The plurality of sub-SBs may include, for example, a first edge sub-SB of the first SB, a central sub-SB of the first SB, and a second edge sub-SB of the first SB. In some implementations, sub-SB measurement and reporting of the characteristic within the uplink SB report enables subsets of resource blocks (RBs) within the uplink SB that experience different CLI to be identified. Such information can allow the network node 110 to, for example, reconfigure one or more SBs in order to provide or enhance CLI mitigation.

As shown by reference 708, the UE 120-1 may transmit, and the network node 110 may receive, a report including information associated with the characteristic of the UE-to-UE CLI reference signal in the uplink SB.

In some implementations, the information associated with the characteristic of the UE-to-UE CLI reference signal in the uplink SB includes an indication of whether a blocker is in the uplink SB. For example, the UE 120-1 may in some implementations determine whether the measured characteristic of the UE-to-UE CLI reference signal in the uplink SB satisfies a threshold. Here, if the characteristic satisfies the threshold (e.g., if the RSRP is greater than or equal to the threshold), then the UE 120-1 may determine that a blocker is in the uplink SB (e.g., that intra-SB CLI could affect a dynamic range of a receiver or cause AGC blocking of the receiver). In this example, the information associated with the characteristic includes an indication that the characteristic satisfies the threshold (e.g., that a blocker is in the uplink SB). Conversely, if the characteristic fails to satisfy the threshold (e.g., if the RSRP is less than the threshold), then the UE 120-1 may determine that no blocker is in the uplink SB. In this example, the information associated with the characteristic includes an indication that the characteristic fails to satisfy the threshold (e.g., that a blocker is not in the uplink SB).

In some implementations, the information associated with the characteristic of the UE-to-UE CLI reference signal in the uplink SB may include a one-bit indication associated with the characteristic. For example, the information associated with the characteristic may be a one-bit indication that indicates whether a blocker is in the uplink SB (e.g., a value of 1 indicates a blocker, a value of 0 indicates no blocker).

In some implementations, the information associated with the characteristic may include another type of information associated with the characteristic, such as a value of the characteristic (e.g., the information may indicate the RSRP as measured in the uplink SB). In some implementations, the information associated with the characteristic of the UE-to-UE CLI reference signal includes information associated with the characteristic of the CLI reference signal as measured in the plurality of sub-SBs (e.g., when the UE 120-1 is configured to measure the characteristic in a plurality of sub-SBs, as described above).

As indicated above, FIG. 7 is provided as an example. Other examples may differ from what is described with respect to FIG. 7.

Figure 8:
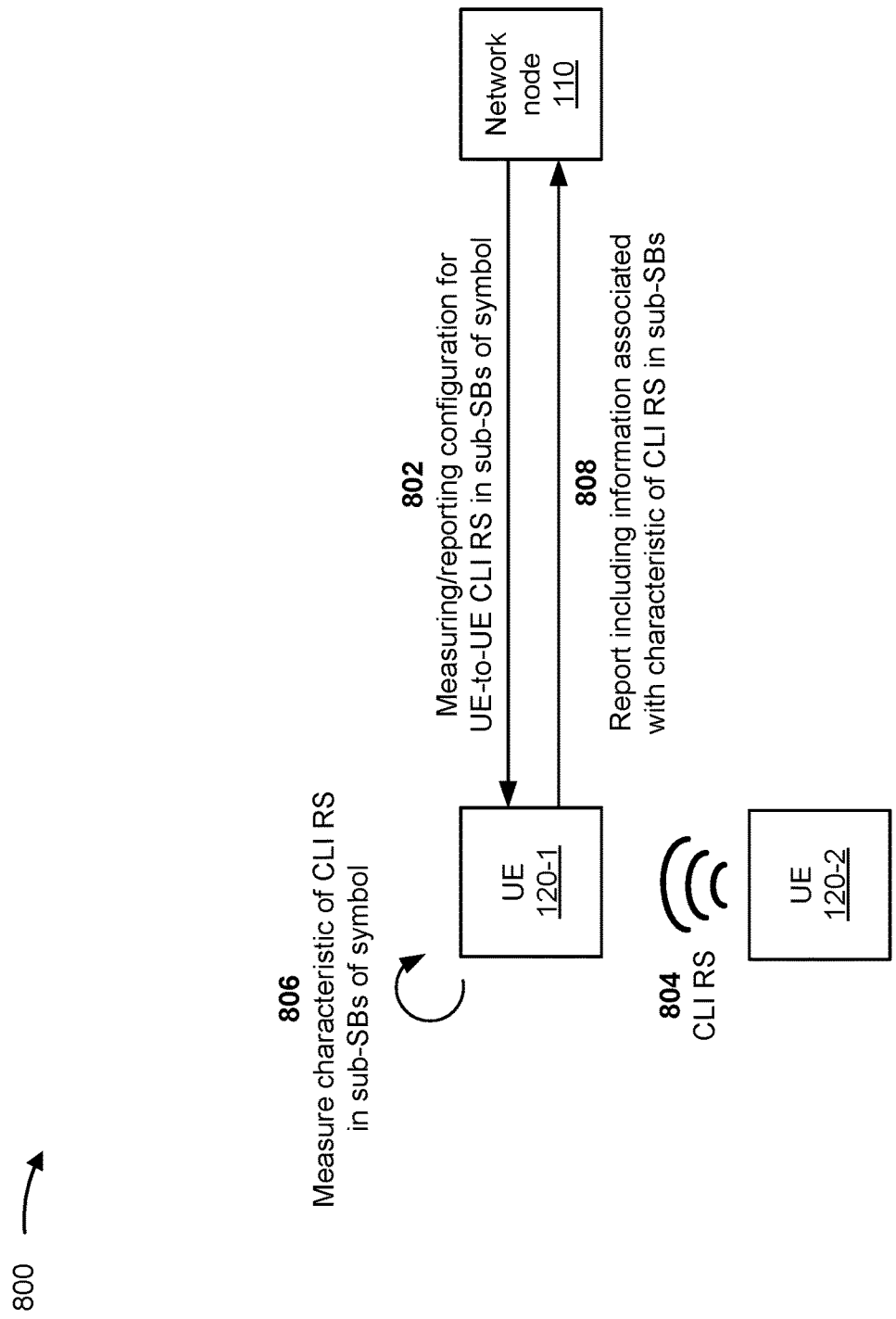

FIG. 8 is a diagram illustrating an example 800 associated with UE-to-UE CLI reporting, in accordance with the present disclosure. As shown in FIG. 8, example 800 includes communication between a network node 110, a UE 120-1, and a UE 120-2. In some aspects, the network node 110, the UE 120-1, and the UE 120-2 may be included in a wireless network, such as a wireless network 100. In some implementations, the network node 110 and the UE 120-1 may communicate via a wireless access link, which may include an uplink and a downlink.

As shown by reference 802, the network node 110 may transmit, and the UE 120-1 may receive, a configuration associated with measuring or reporting a characteristic of a UE-to-UE CLI reference signal in a plurality of sub-SBs of a symbol, the plurality of sub-SBs being included in an SB of the symbol.

In some implementations, the configuration includes information based at least in part on the UE 120-1 is to measure a characteristic of a UE-to-UE CLI reference signal or report information associated with the measured characteristic of the UE-to-UE CLI reference signal. For example, the configuration may indicate the characteristic that is to be measured by the UE 120-1. The characteristic may be, for example, an RSRP, an RSSI, or a signal-to-interference-plus-noise ratio (SINR), among other examples. As another example, the configuration may indicate the SB in which the characteristic is to be measured. As another example, the configuration may indicate the symbol in which the characteristic is to be measured. As another example, the configuration may indicate a set of resources (e.g., one or more uplink SBs, one or more downlink SBs, one or more symbols) in which the UE 120-1 can expect the UE-to-UE CLI reference signal to receive the UE-to-UE CLI reference signal.

As shown by reference 804, the UE 120-2 may transmit the UE-to-UE CLI reference signal. In some implementations, the UE-to-UE CLI reference signal may be, for example, an SRS or another type of signal transmitted on the uplink by the UE 120-2. In some implementations, the UE 120-2 may transmit the UE-to-UE CLI reference signal based at least in part on a configuration from the network node 110. For example, the network node 110 may transmit, and the UE 120-2 may receive, a configuration that indicates a set of resources (e.g., one or more SBs, one or more symbols) in which the UE 120-2 is to transmit the UE-to-UE CLI reference signal, and the UE 120-2 may transmit the UE-to-UE CLI reference signal in the indicated set of resources.

As shown by reference 806, the UE 120-1 may measure the characteristic of the UE-to-UE CLI reference signal in the plurality of sub-SBs of the symbol. In some implementations, the plurality of sub-SBs may include a first edge sub-SB of the first SB, a central sub-SB of the first SB, and a second edge sub-SB of the first SB. In some implementations, sub-SB measurement and reporting of the characteristic within the SB report enables subsets of RBs within the SB that experience different CLI to be identified. Such information can allow the network node 110 to, for example, reconfigure one or more uplink SBs or one or more downlink SBs in order to provide or enhance CLI mitigation.

In some implementations, the SB in which the UE 120-1 measures the characteristic of the UE-to-UE CLI reference signal in the plurality of sub-SBs may be an uplink SB. In some implementations, the characteristic of the UE-to-UE CLI reference signal is measured in the uplink SB in association with detecting intra-SB CLI that affects a dynamic range of a receiver or causes AGC blocking of the receiver. That is, in some implementations, the UE 120-1 measures the characteristic of the UE-to-UE CLI reference signal in association with detecting whether a blocker is present in the uplink SB.

In some implementations, the SB in which the UE 120-1 measures the characteristic of the UE-to-UE CLI reference signal in the plurality of sub-SBs may be a downlink SB. In some implementations, the characteristic of the UE-to-UE CLI reference signal is measured in the downlink SB in association with detecting inter-SB leakage (e.g., interference from a different SB).

In some implementations, the symbol in which the UE 120-1 measures the characteristic of the UE-to-UE CLI reference signal is a network node SBFD symbol. Alternatively, the symbol in which the UE 120-1 measure the characteristic of the UE-to-UE CLI reference signal may be configured as an SBFD symbol and may be a legacy downlink symbol or a legacy flexible symbol. For example, in a TDD common slot format, a slot or symbol can be configured as downlink, uplink, or flexible. However, for SBFD operation, a legacy downlink symbol or slot may be indicated or configured as an SBFD symbol or slot for SBFD operation (e.g., for some UEs 120 to transmit uplink communications in an uplink SB of the SBFD symbol for SBFD operation, and for other UEs 120 to receive downlink communications in a downlink SB of the SBFD symbol).

Thus, in some implementations, the symbol may be a legacy downlink symbol or a legacy flexible symbol that is configured as an SBFD symbol.

In some implementations, the UE 120-1 may measure the characteristic of the UE-to-UE CLI reference signal in pluralities of symbols associated with multiple SBs. For example, the UE 120-1 may measure the characteristic of the UE-to-UE CLI reference signal in a first plurality of sub-SBs of the symbol (e.g., a plurality of sub-SBs included in a first SB), may measure the characteristic of the UE-to-UE CLI reference signal in a second plurality of sub-SBs of the symbol (e.g., a plurality of sub-SBs included in a second SB), and so on. As a particular example, the UE 120-1 may measure an RSRP of an SRS in a plurality of sub-SBs of a downlink SB of an SBFD symbol and may measure an RSRP of the SRS in a plurality of sub-SBs of an uplink SB of the SBFD symbol (e.g., when the SBFD symbol has a D/U configuration). As another particular example, the UE 120-1 may measure an RSRP of an SRS in a plurality of sub-SBs of a first downlink SB of an SBFD symbol, may measure an RSRP of the SRS in a plurality of sub-SBs of an uplink SB of the SBFD symbol, and may measure an RSRP of the SRS in a plurality of sub-SBs of a second downlink SB of the SBFD symbol (e.g., when the SBFD symbol has a D/U/D configuration).

As shown by reference 808, the UE 120-1 may transmit, and the network node 110 may receive, a report including information associated with the characteristic of the UE-to-UE CLI reference signal in the plurality of sub-SBs.

In some implementations, if the SB is an uplink SB, then the information associated with the characteristic of the UE-to-UE CLI reference signal in the plurality of sub-SBs includes an indication of whether a blocker is in a given sub-SB of the uplink SB. For example, the UE 120-1 may in some implementations determine whether the measured characteristic of the UE-to-UE CLI reference signal in a given sub-SB of the uplink SB satisfies a threshold. Here, if the characteristic satisfies the threshold, then the UE 120-1 may determine that a blocker is in the sub-SB of the uplink SB (e.g., that intra-SB CLI could affect a dynamic range of a receiver or cause AGC blocking of the receiver). In this example, the information associated with the characteristic includes an indication that the characteristic satisfies the threshold. Conversely, if the characteristic fails to satisfy the threshold, then the UE 120-1 may determine that no blocker is in the sub-SB of the uplink SB. In this example, the information associated with the characteristic includes an indication that the characteristic fails to satisfy the threshold.

In some implementations, if the SB is a downlink SB, then the information associated with the characteristic of the UE-to-UE CLI reference signal in the plurality of sub-SBs includes an indication of whether a threshold amount of inter-SB CLI leakage is present in a given sub-SB of the downlink SB. For example, the UE 120-1 may in some implementations determine whether the measured characteristic of the UE-to-UE CLI reference signal in a given sub-SB of the downlink SB satisfies a threshold. Here, if the characteristic satisfies the threshold, then the UE 120-1 may determine that a threshold amount of inter-SB CLI leakage is present in the sub-SB of the downlink SB. In this example, the information associated with the characteristic includes an indication that the characteristic satisfies the threshold. Conversely, if the characteristic fails to satisfy the threshold, then the UE 120-1 may determine that an insubstantial amount of inter-SB leakage is in the sub-SB of the downlink SB. In this example, the information associated with the characteristic includes an indication that the characteristic fails to satisfy the threshold.

In some implementations, the information associated with the characteristic of the UE-to-UE CLI reference signal in a given sub-SB may include a one-bit indication associated with the characteristic. For example, the information associated with the characteristic may be a one-bit indication that indicates whether a blocker is in a given sub-SB of an uplink SB (e.g., a value of 1 indicates a blocker, a value of 0 indicates no blocker). As another example, the information associated with the characteristic may be a one-bit indication that indicates whether inter-SB leakage is in a given sub-SB of a downlink SB (e.g., a value of 1 indicates inter-SB CLI leakage, a value of 0 indicates no or insubstantial inter-SB CLI leakage).

In some implementations, the information associated with the characteristic for a given sub-SB may include another type of information associated with the characteristic, such as a value of the characteristic (e.g., the information may indicate the RSRP as measured in the sub-SB). In some implementations, the information associated with the characteristic of the UE-to-UE CLI reference signal includes information associated with the characteristic of the CLI reference signal as measured in each sub-SB of the plurality of sub-SBs (e.g., for one SB or for more than one SB).

As indicated above, FIG. 8 is provided as an example. Other examples may differ from what is described with respect to FIG. 8.

Figure 9:
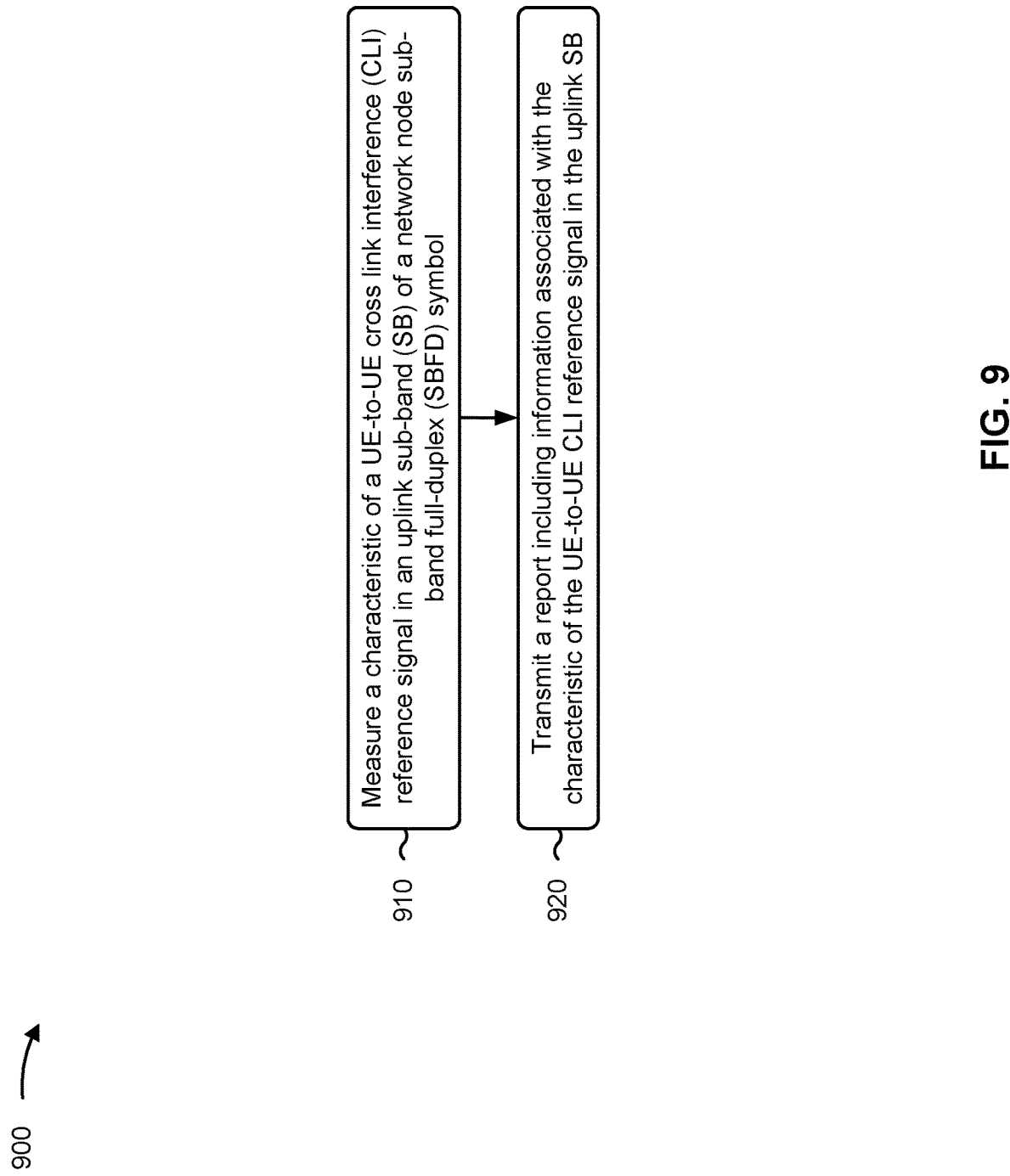
FIGS. 9 and 10 are diagrams illustrating example processes performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with UE-to-UE CLI reporting.

As shown in FIG. 9, in some aspects, process 900 may include measuring a characteristic of a UE-to-UE CLI reference signal in an uplink SB of a network node SBFD symbol (block 910). For example, the UE (e.g., using communication manager 140 and/or measurement component 1308, depicted in FIG. 13) may measure a characteristic of a UE-to-UE CLI reference signal in an uplink SB of a network node SBFD symbol, as described above.

As further shown in FIG. 9, in some aspects, process 900 may include transmitting a report including information associated with the characteristic of the UE-to-UE CLI reference signal in the uplink SB (block 920). For example, the UE (e.g., using communication manager 140 and/or transmission component 1304, depicted in FIG. 13) may transmit a report including information associated with the characteristic of the UE-to-UE CLI reference signal in the uplink SB, as described above.

Process 900 may include additional aspects, such as any single aspect or any combination of aspects described below and/or in connection with one or more other processes described elsewhere herein.

In a first aspect, the characteristic includes an RSRP, an RSSI, or some combination thereof.

In a second aspect, alone or in combination with the first aspect, the information associated with the characteristic of the UE-to-UE CLI reference signal in the uplink SB includes an indication of whether a blocker is present in the uplink SB.

In a third aspect, alone or in combination with one or more of the first and second aspects, the characteristic of the UE-to-UE CLI reference signal is measured in the uplink SB in association with detecting intra-SB CLI that affects a dynamic range of a receiver or causes AGC blocking of the receiver.

In a fourth aspect, alone or in combination with one or more of the first through third aspects, the information associated with the characteristic of the UE-to-UE CLI reference signal in the uplink SB comprises a one-bit indication associated with the characteristic.

In a fifth aspect, alone or in combination with one or more of the first through fourth aspects, process 900 includes determining whether the characteristic of the UE-to-UE CLI reference signal in the uplink SB satisfies a threshold, wherein the information associated with the characteristic includes an indication of whether the characteristic satisfies the threshold.

In a sixth aspect, alone or in combination with one or more of the first through fifth aspects, in association with measuring the characteristic of the UE-to-UE CLI reference signal, the UE is not expected to measure the characteristic with a SCS other than an SCS configured for the uplink SB including a UE-to-UE CLI reference signal resource on the network node SBFD symbol.

In a seventh aspect, alone or in combination with one or more of the first through sixth aspects, the characteristic of the UE-to-UE CLI reference signal is measured with a SCS configured for the uplink SB including a UE-to-UE CLI reference signal resource on the network node SBFD symbol.

In an eighth aspect, alone or in combination with one or more of the first through seventh aspects, in association with measuring the characteristic of the UE-to-UE CLI reference signal, the UE is not expected to measure the characteristic of the UE-to-UE CLI reference signal using a measurement resource that is not confined within the uplink SB on the network node SBFD symbol.

In a ninth aspect, alone or in combination with one or more of the first through eighth aspects, the characteristic of the UE-to-UE CLI reference signal is measured using a measurement resource that is confined within the uplink SB on the network node SBFD symbol.

In a tenth aspect, alone or in combination with one or more of the first through ninth aspects, measuring the characteristic of the UE-to-UE CLI reference signal in the uplink SB of the network node SBFD symbol comprises measuring the characteristic of the UE-to-UE CLI reference signal in a plurality of sub-SBs of the uplink SB in the network node SBFD symbol, wherein the information associated with the characteristic of the UE-to-UE CLI reference signal includes information associated with the characteristic of the CLI reference signal as measured in the plurality of sub-SBs.

In an eleventh aspect, alone or in combination with one or more of the first through tenth aspects, process 900 includes receiving a configuration associated with measuring or reporting the characteristic of the UE-to-UE CLI reference signal in an uplink SB.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
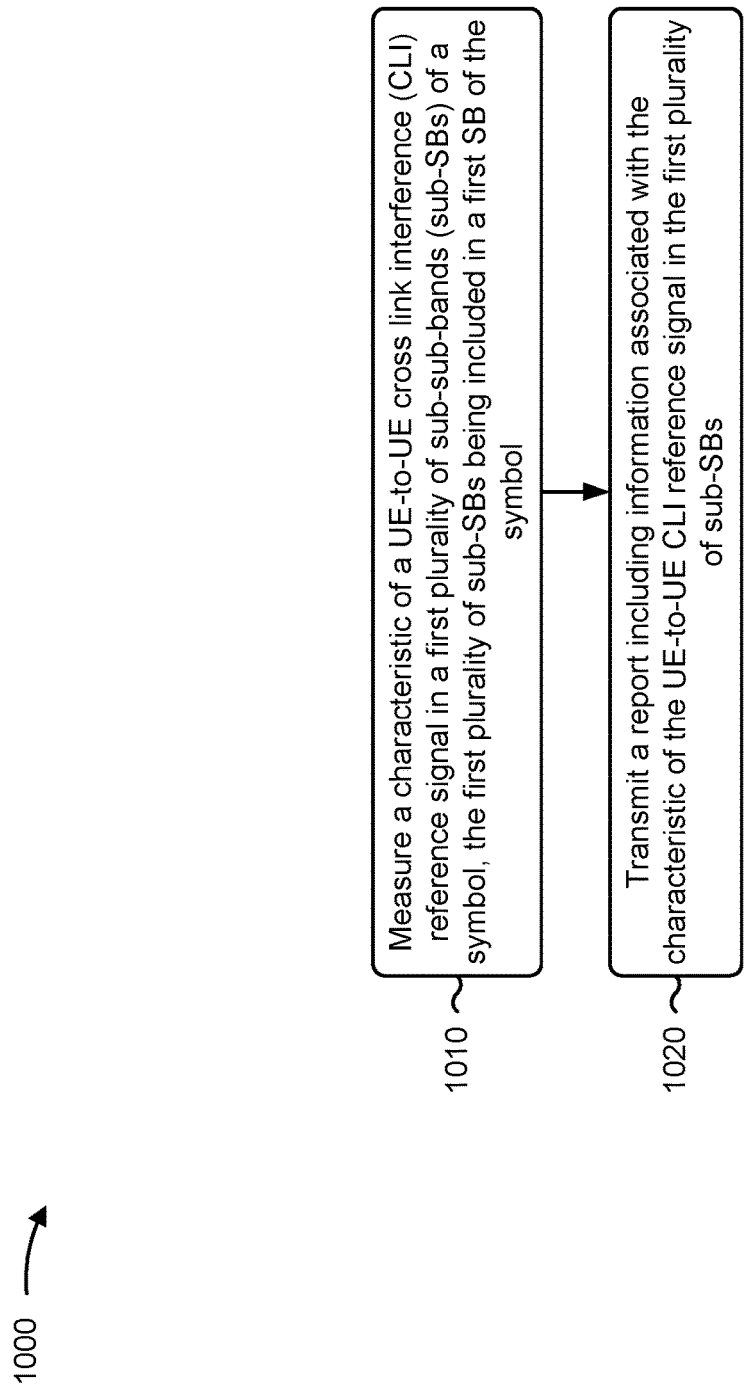

FIG. 10 is a diagram illustrating an example process 1000 performed, for example, by a UE, in accordance with the present disclosure. Example process 1000 is an example where the UE (e.g., UE 120) performs operations associated with UE-to-UE CLI reporting.

As shown in FIG. 10, in some aspects, process 1000 may include measuring a characteristic of a UE-to-UE CLI reference signal in a first plurality of sub-SBs of a symbol, the first plurality of sub-SBs being included in a first SB of the symbol (block 1010). For example, the UE (e.g., using communication manager 140 and/or measurement component 1308, depicted in FIG. 13) may measure a characteristic of a UE-to-UE CLI reference signal in a first plurality of sub-SBs of a symbol, the first plurality of sub-SBs being included in a first SB of the symbol, as described above.

As further shown in FIG. 10, in some aspects, process 1000 may include transmitting a report including information associated with the characteristic of the UE-to-UE CLI reference signal in the first plurality of sub-SBs (block 1020). For example, the UE (e.g., using communication manager 140 and/or transmission component 1304, depicted in FIG. 13) may transmit a report including information associated with the characteristic of the UE-to-UE CLI reference signal in the first plurality of sub-SBs, as described above.

Process 1000 may include additional aspects, such as any single aspect or any combination of aspects described below and/or in connection with one or more other processes described elsewhere herein.

In a first aspect, the characteristic includes an RSRP, an RSSI, an SINR, or some combination thereof.

In a second aspect, alone or in combination with the first aspect, the plurality of sub-SBs includes a first edge sub-SB of the first SB, a central sub-SB of the first SB, and a second edge sub-SB of the first SB.

In a third aspect, alone or in combination with one or more of the first and second aspects, the first SB is an uplink SB.

In a fourth aspect, alone or in combination with one or more of the first through third aspects, the characteristic of the UE-to-UE CLI reference signal is measured in the uplink SB in association with detecting intra-SB CLI that affects a dynamic range of a receiver or causes AGC blocking of the receiver.

In a fifth aspect, alone or in combination with one or more of the first through fourth aspects, the first SB is a downlink SB.

In a sixth aspect, alone or in combination with one or more of the first through fifth aspects, the characteristic of the UE-to-UE CLI reference signal is measured in the downlink SB in association with detecting inter-SB leakage.

In a seventh aspect, alone or in combination with one or more of the first through sixth aspects, the symbol is a network node SBFD symbol.

In an eighth aspect, alone or in combination with one or more of the first through seventh aspects, the symbol is configured as an SBFD symbol and is a legacy downlink symbol or a legacy flexible symbol.

In a ninth aspect, alone or in combination with one or more of the first through eighth aspects, process 1000 includes information associated with the characteristic of the UE-to-UE CLI reference signal in the second plurality of sub-SBs.

In a tenth aspect, alone or in combination with one or more of the first through ninth aspects, the first SB is an uplink SB of the symbol and the second SB is a downlink SB of the symbol.

In an eleventh aspect, alone or in combination with one or more of the first through tenth aspects, process 1000 includes receiving a configuration associated with measuring or reporting the characteristic of the UE-to-UE CLI reference signal in in the first plurality of sub-SBs of the symbol.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
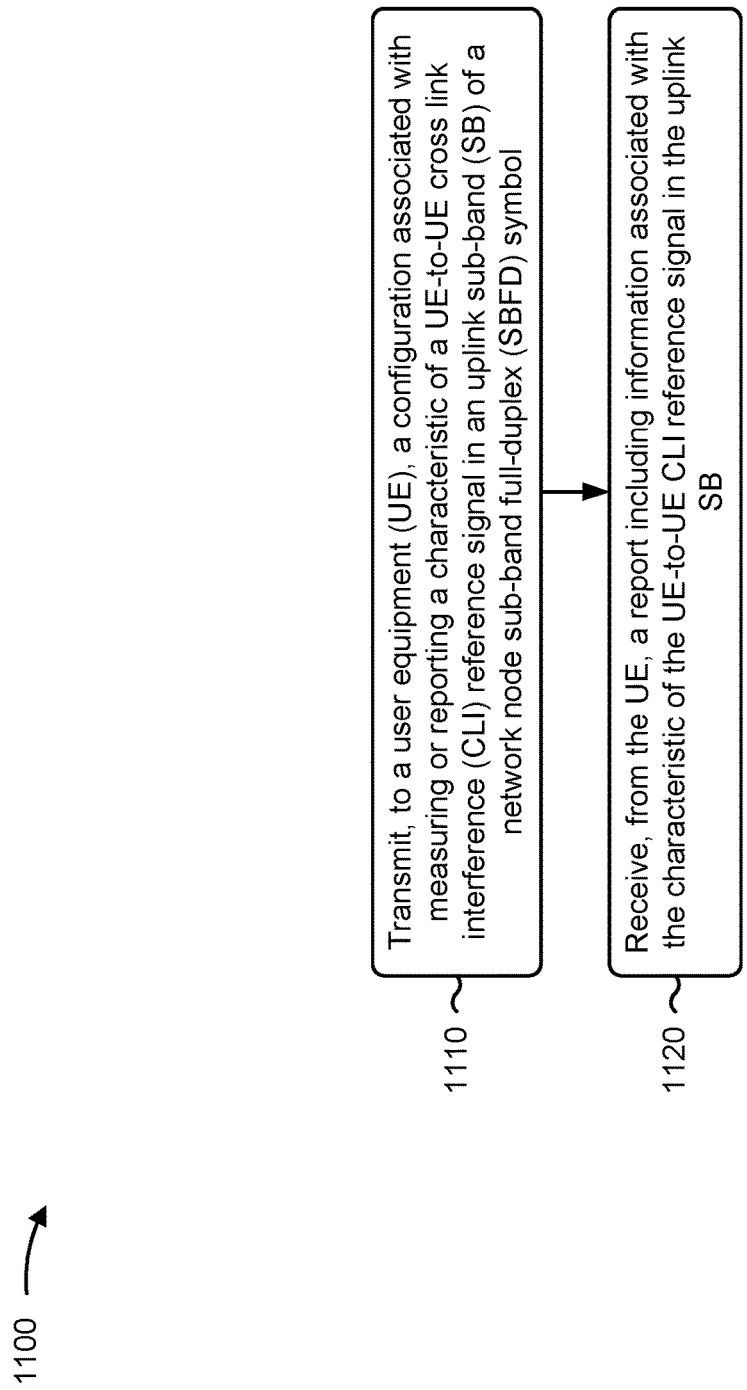
FIGS. 11 and 12 are diagrams illustrating example processes performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with UE-to-UE CLI reporting.

As shown in FIG. 11, in some aspects, process 1100 may include transmitting, to a UE, a configuration associated with measuring or reporting a characteristic of a UE-to-UE CLI reference signal in an uplink SB of a network node SBFD symbol (block 1110). For example, the network node (e.g., using communication manager 150 and/or transmission component 1404, depicted in FIG. 14) may transmit, to a UE, a configuration associated with measuring or reporting a characteristic of a UE-to-UE CLI reference signal in an uplink SB of a network node SBFD symbol, as described above.

As further shown in FIG. 11, in some aspects, process 1100 may include receiving, from the UE, a report including information associated with the characteristic of the UE-to-UE CLI reference signal in the uplink SB (block 1120). For example, the network node (e.g., using communication manager 150 and/or reception component 1402, depicted in FIG. 14) may receive, from the UE, a report including information associated with the characteristic of the UE-to-UE CLI reference signal in the uplink SB, as described above.

Process 1100 may include additional aspects, such as any single aspect or any combination of aspects described below and/or in connection with one or more other processes described elsewhere herein.

In a first aspect, the characteristic includes an RSRP, an RSSI, or some combination thereof.

In a second aspect, alone or in combination with the first aspect, the information associated with the characteristic of the UE-to-UE CLI reference signal in the uplink SB includes an indication of whether a blocker is present in the uplink SB.

In a third aspect, alone or in combination with one or more of the first and second aspects, the characteristic of the UE-to-UE CLI reference signal is to be measured in the uplink SB in association with detecting intra-SB CLI that affects a dynamic range of a receiver or causes AGC blocking of the receiver.

In a fourth aspect, alone or in combination with one or more of the first through third aspects, the information associated with the characteristic of the UE-to-UE CLI reference signal in the uplink SB comprises a one-bit indication associated with the characteristic.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
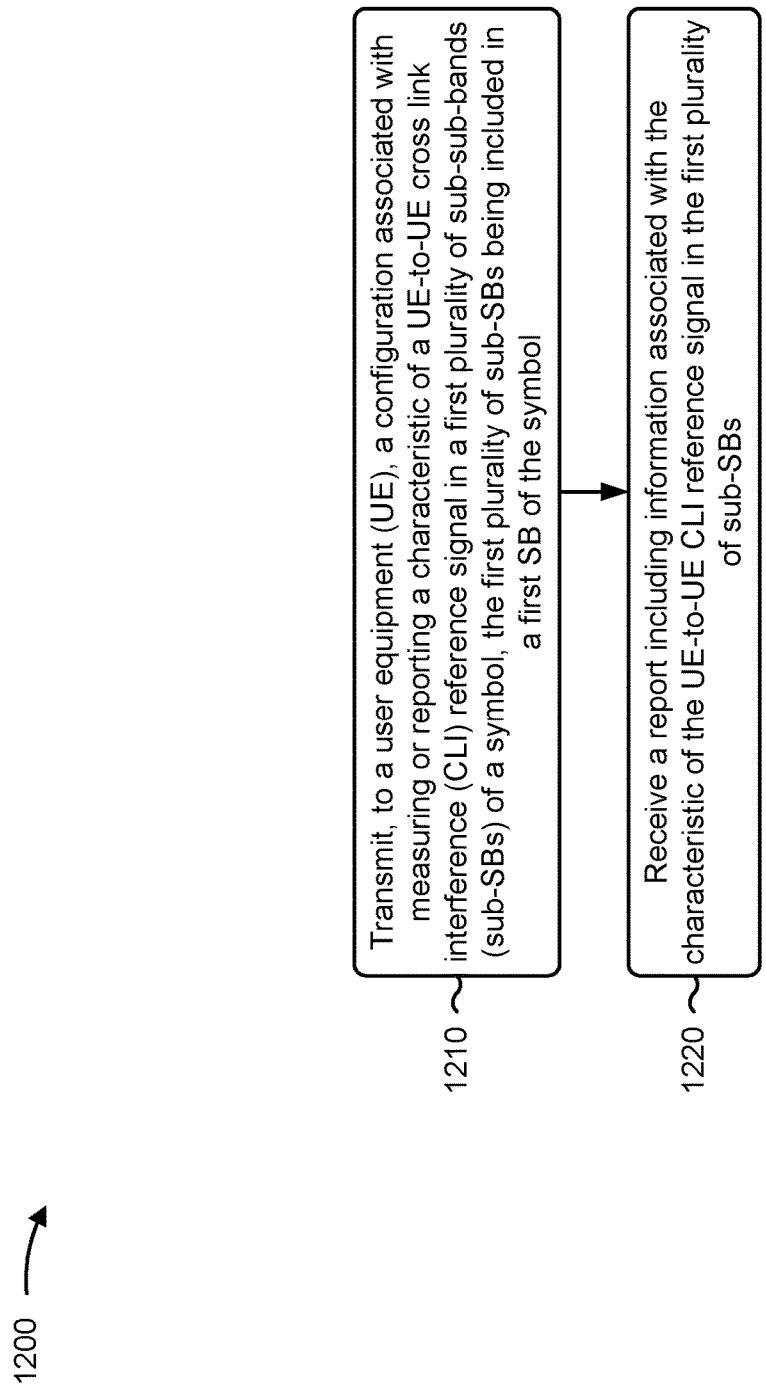

FIG. 12 is a diagram illustrating an example process 1200 performed, for example, by a network node, in accordance with the present disclosure. Example process 1200 is an example where the network node (e.g., network node 110) performs operations associated with UE-to-UE CLI reporting.

As shown in FIG. 12, in some aspects, process 1200 may include transmitting, to a UE, a configuration associated with measuring or reporting a characteristic of a UE-to-UE CLI reference signal in a first plurality of sub-SBs of a symbol, the first plurality of sub-SBs being included in a first SB of the symbol (block 1210). For example, the network node (e.g., using communication manager 150 and/or transmission component 1404, depicted in FIG. 14) may transmit, to a UE, a configuration associated with measuring or reporting a characteristic of a UE-to-UE CLI reference signal in a first plurality of sub-SBs of a symbol, the first plurality of sub-SBs being included in a first SB of the symbol, as described above.

As further shown in FIG. 12, in some aspects, process 1200 may include receiving a report including information associated with the characteristic of the UE-to-UE CLI reference signal in the first plurality of sub-SBs (block 1220). For example, the network node (e.g., using communication manager 150 and/or reception component 1402, depicted in FIG. 14) may receive a report including information associated with the characteristic of the UE-to-UE CLI reference signal in the first plurality of sub-SBs, as described above.

Process 1200 may include additional aspects, such as any single aspect or any combination of aspects described below and/or in connection with one or more other processes described elsewhere herein.

In a first aspect, the characteristic includes an RSRP, an RSSI, an SINR, or some combination thereof.

In a second aspect, alone or in combination with the first aspect, the plurality of sub-SBs includes a first edge sub-SB of the first SB, a central sub-SB of the first SB, and a second edge sub-SB of the first SB.

In a third aspect, alone or in combination with one or more of the first and second aspects, the first SB is an uplink SB.

In a fourth aspect, alone or in combination with one or more of the first through third aspects, the characteristic of the UE-to-UE CLI reference signal is to be measured in the uplink SB in association with detecting intra-SB CLI that affects a dynamic range of a receiver or causes AGC blocking of the receiver.

In a fifth aspect, alone or in combination with one or more of the first through fourth aspects, the first SB is a downlink SB.

In a sixth aspect, alone or in combination with one or more of the first through fifth aspects, the characteristic of the UE-to-UE CLI reference signal is to be measured in the downlink SB in association with detecting inter-SB leakage.

In a seventh aspect, alone or in combination with one or more of the first through sixth aspects, the symbol is a network node SBFD symbol.

In an eighth aspect, alone or in combination with one or more of the first through seventh aspects, the symbol is configured as an SBFD symbol and is a legacy downlink symbol or a legacy flexible symbol.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
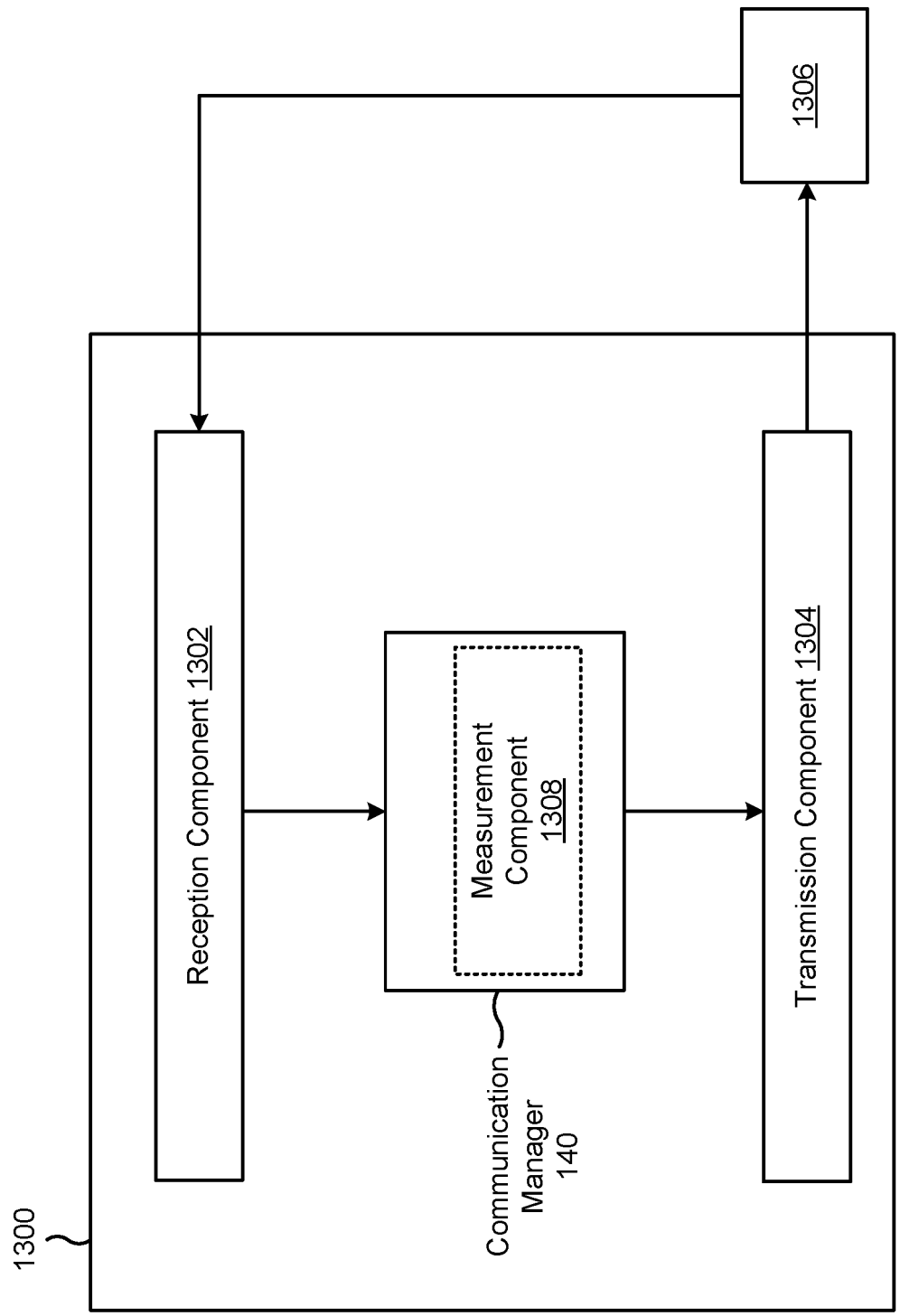
FIGS. 13 and 14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a measurement component 1308, among other examples.

In some aspects, the apparatus 1300 may be configured to perform one or more operations described herein in connection with FIGS. 7 and 8. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

In some implementations, the measurement component 1308 may measure a characteristic of a UE-to-UE CLI reference signal in an uplink SB of a network node SBFD symbol. In some implementations, the transmission component 1304 may transmit a report including information associated with the characteristic of the UE-to-UE CLI reference signal in the uplink SB. In some implementations, the measurement component 1308 may determine whether the characteristic of the UE-to-UE CLI reference signal in the uplink SB satisfies a threshold, wherein the information associated with the characteristic includes an indication of whether the characteristic satisfies the threshold. In some implementations, the reception component 1302 may receive a configuration associated with measuring or reporting the characteristic of the UE-to-UE CLI reference signal in an uplink SB.

In some implementations, The measurement component 1308 may measure a characteristic of a UE-to-UE CLI reference signal in a first plurality of sub-SBs of a symbol, the first plurality of sub-SBs being included in a first SB of the symbol. In some implementations, the transmission component 1304 may transmit a report including information associated with the characteristic of the UE-to-UE CLI reference signal in the first plurality of sub-SBs. In some implementations, the reception component 1302 may receive a configuration associated with measuring or reporting the characteristic of the UE-to-UE CLI reference signal in in the first plurality of sub-SBs of the symbol.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
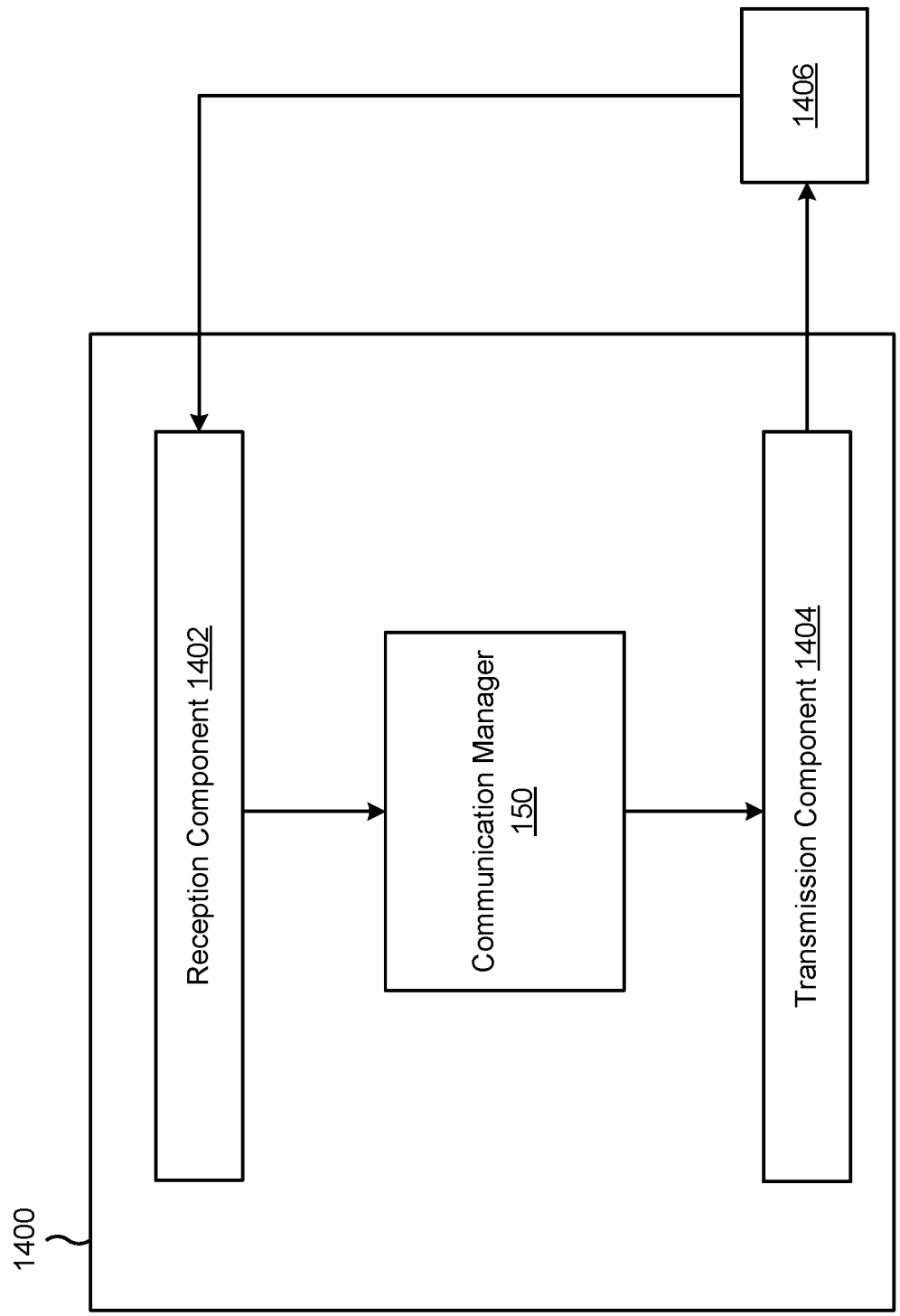

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150.

In some aspects, the apparatus 1400 may be configured to perform one or more operations described herein in connection with FIGS. 7 and 8. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

In some implementations, the transmission component 1404 may transmit, to a UE, a configuration associated with measuring or reporting a characteristic of a UE-to-UE CLI reference signal in an uplink SB of a network node SBFD symbol. In some implementations, the reception component 1402 may receive, from the UE, a report including information associated with the characteristic of the UE-to-UE CLI reference signal in the uplink SB.

In some implementations, the transmission component 1404 may transmit, to a UE, a configuration associated with measuring or reporting a characteristic of a UE-to-UE CLI reference signal in a first plurality of sub-SBs of a symbol, the first plurality of sub-SBs being included in a first SB of the symbol. In some implementations, the reception component 1402 may receive a report including information associated with the characteristic of the UE-to-UE CLI reference signal in the first plurality of sub-SBs.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by an apparatus of a UE, comprising: measuring a characteristic of a UE-to-UE CLI reference signal in an uplink SB of a network node SBFD symbol; and transmitting a report including information associated with the characteristic of the UE-to-UE CLI reference signal in the uplink SB.

Aspect 2: The method of Aspect 1, wherein the characteristic includes an RSRP, an RSSI, or some combination thereof.

Aspect 3: The method of any of Aspects 1-2, wherein the information associated with the characteristic of the UE-to-UE CLI reference signal in the uplink SB includes an indication of whether a blocker is present in the uplink SB.

Aspect 4: The method of any of Aspects 1-3, wherein the characteristic of the UE-to-UE CLI reference signal is measured in the uplink SB in association with detecting intra-SB CLI that affects a dynamic range of a receiver or causes AGC blocking of the receiver.

Aspect 5: The method of any of Aspects 1-4, wherein the information associated with the characteristic of the UE-to-UE CLI reference signal in the uplink SB comprises a one-bit indication associated with the characteristic.

Aspect 6: The method of any of Aspects 1-5, further comprising determining whether the characteristic of the UE-to-UE CLI reference signal in the uplink SB satisfies a threshold, wherein the information associated with the characteristic includes an indication of whether the characteristic satisfies the threshold.

Aspect 7: The method of any of Aspects 1-6, wherein, in association with measuring the characteristic of the UE-to-UE CLI reference signal, the UE is not expected to measure the characteristic with a SCS other than an SCS configured for the uplink SB including a UE-to-UE CLI reference signal resource on the network node SBFD symbol.

Aspect 8: The method of any of Aspects 1-7, wherein the characteristic of the UE-to-UE CLI reference signal is measured with a SCS configured for the uplink SB including a UE-to-UE CLI reference signal resource on the network node SBFD symbol.

Aspect 9: The method of any of Aspects 1-8, wherein, in association with measuring the characteristic of the UE-to-UE CLI reference signal, the UE is not expected to measure the characteristic of the UE-to-UE CLI reference signal using a measurement resource that is not confined within the uplink SB on the network node SBFD symbol.

Aspect 10: The method of any of Aspects 1-9, wherein the characteristic of the UE-to-UE CLI reference signal is measured using a measurement resource that is confined within the uplink SB on the network node SBFD symbol.

Aspect 11: The method of any of Aspects 1-10, wherein measuring the characteristic of the UE-to-UE CLI reference signal in the uplink SB of the network node SBFD symbol comprises: measuring the characteristic of the UE-to-UE CLI reference signal in a plurality of sub-SBs of the uplink SB in the network node SBFD symbol, wherein the information associated with the characteristic of the UE-to-UE CLI reference signal includes information associated with the characteristic of the CLI reference signal as measured in the plurality of sub-SBs.

Aspect 12: The method of any of Aspects 1-11, further comprising receiving a configuration associated with measuring or reporting the characteristic of the UE-to-UE CLI reference signal in an uplink SB.

Aspect 13: A method of wireless communication performed by an apparatus of a UE, comprising: measuring a characteristic of a UE-to-UE CLI reference signal in a first plurality of sub-SBs of a symbol, the first plurality of sub-SBs being included in a first SB of the symbol; and transmitting a report including information associated with the characteristic of the UE-to-UE CLI reference signal in the first plurality of sub-SBs.

Aspect 14: The method of Aspect 13, wherein the characteristic includes an RSRP, an RSSI, an SINR, or some combination thereof.

Aspect 15: The method of any of Aspects 13-14, wherein the plurality of sub-SBs includes a first edge sub-SB of the first SB, a central sub-SB of the first SB, and a second edge sub-SB of the first SB.

Aspect 16: The method of any of Aspects 13-15, wherein the first SB is an uplink SB.

Aspect 17: The method of Aspect 16, wherein the characteristic of the UE-to-UE CLI reference signal is measured in the uplink SB in association with detecting intra-SB CLI that affects a dynamic range of a receiver or causes AGC blocking of the receiver.

Aspect 18: The method of any of Aspects 13-17, wherein the first SB is a downlink SB.

Aspect 19: The method of Aspect 18, wherein the characteristic of the UE-to-UE CLI reference signal is measured in the downlink SB in association with detecting inter-SB leakage.

Aspect 20: The method of any of Aspects 13-19, wherein the symbol is a network node SBFD symbol.

Aspect 21: The method of any of Aspects 13-20, wherein the symbol is configured as an SBFD symbol and is a legacy downlink symbol or a legacy flexible symbol.

Aspect 22: The method of any of Aspects 13-21, further comprising measuring a characteristic of the UE-to-UE CLI reference signal in a second plurality of sub-SBs of the symbol, the second plurality of sub-SBs being included in a second SB of the symbol, wherein the report further includes information associated with the characteristic of the UE-to-UE CLI reference signal in the second plurality of sub-SBs.

Aspect 23: The method of Aspect 22, wherein the first SB is an uplink SB of the symbol and the second SB is a downlink SB of the symbol.

Aspect 24: The method of any of Aspects 13-23, further comprising receiving a configuration associated with measuring or reporting the characteristic of the UE-to-UE CLI reference signal in in the first plurality of sub-SBs of the symbol.

Aspect 25: A method of wireless communication performed by an apparatus of a network node, comprising: transmitting, to a UE, a configuration associated with measuring or reporting a characteristic of a UE-to-UE CLI reference signal in an uplink SB of a network node SBFD symbol; and receiving, from the UE, a report including information associated with the characteristic of the UE-to-UE CLI reference signal in the uplink SB.

Aspect 26: The method of Aspect 25, wherein the characteristic includes an RSRP, an RSSI, or some combination thereof.

Aspect 27: The method of any of Aspects 25-26, wherein the information associated with the characteristic of the UE-to-UE CLI reference signal in the uplink SB includes an indication of whether a blocker is present in the uplink SB.

Aspect 28: The method of any of Aspects 25-27, wherein the characteristic of the UE-to-UE CLI reference signal is to be measured in the uplink SB in association with detecting intra-SB CLI that affects a dynamic range of a receiver or causes AGC blocking of the receiver.

Aspect 29: The method of any of Aspects 25-28, wherein the information associated with the characteristic of the UE-to-UE CLI reference signal in the uplink SB comprises a one-bit indication associated with the characteristic.

Aspect 30: A method of wireless communication performed by an apparatus of a network node, comprising: transmitting, to a UE, a configuration associated with measuring or reporting a characteristic of a UE-to-UE CLI reference signal in a first plurality of sub-SBs of a symbol, the first plurality of sub-SBs being included in a first SB of the symbol; and receiving a report including information associated with the characteristic of the UE-to-UE CLI reference signal in the first plurality of sub-SBs.

Aspect 31: The method of Aspect 30, wherein the characteristic includes an RSRP, an RSSI, an SINR, or some combination thereof.

Aspect 32: The method of any of Aspects 30-31, wherein the plurality of sub-SBs includes a first edge sub-SB of the first SB, a central sub-SB of the first SB, and a second edge sub-SB of the first SB.

Aspect 33: The method of any of Aspects 30-32, wherein the first SB is an uplink SB.

Aspect 34: The method of Aspect 33, wherein the characteristic of the UE-to-UE CLI reference signal is to be measured in the uplink SB in association with detecting intra-SB CLI that affects a dynamic range of a receiver or causes AGC blocking of the receiver.

Aspect 35: The method of any of Aspects 30-34, wherein the first SB is a downlink SB.

Aspect 36: The method of Aspect 35, wherein the characteristic of the UE-to-UE CLI reference signal is to be measured in the downlink SB in association with detecting inter-SB leakage.

Aspect 37: The method of any of Aspects 30-36, wherein the symbol is a network node SBFD symbol.

Aspect 38: The method of any of Aspects 30-37, wherein the symbol is configured as an SBFD symbol and is a legacy downlink symbol or a legacy flexible symbol.

Aspect 39: A system configured to perform one or more operations recited in one or more of Aspects 1-38.

Aspect 40: An apparatus comprising means for performing one or more operations recited in one or more of Aspects 1-38.

Aspect 41: A non-transitory computer-readable medium storing a set of instructions, the set of instructions comprising one or more instructions that, when executed by a device, cause the device to perform one or more operations recited in one or more of Aspects 1-38.

Aspect 42: A computer program product comprising instructions or code for executing one or more operations recited in one or more of Aspects 1-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   receive a configuration associated with measuring or reporting a characteristic of a UE-to-UE cross link interference (CLI) reference signal, wherein the configuration indicates a symbol in which the characteristic is to be measured;
   measure the characteristic of the UE-to-UE CLI reference signal in an uplink sub-band (SB) of the symbol, wherein the symbol comprises a network node sub-band full-duplex (SBFD) symbol; and
   transmit a report including information associated with the characteristic of the UE-to-UE CLI reference signal.

2. The UE of claim 1, wherein the characteristic includes a reference signal received power (RSRP), a received signal strength indicator (RSSI), or some combination thereof.

3. The UE of claim 1, wherein the information associated with the characteristic of the UE-to-UE CLI reference signal includes an indication of whether a blocker is present in the uplink SB.

4. The UE of claim 1, wherein the characteristic of the UE-to-UE CLI reference signal is measured in the uplink SB in association with detecting intra-SB CLI that affects a dynamic range of a receiver or causes automatic gain control (AGC) blocking of the receiver.

5. The UE of claim 1, wherein the information associated with the characteristic of the UE-to-UE CLI reference signal comprises a one-bit indication associated with the characteristic.

6. The UE of claim 1, wherein the one or more processors are further configured to determine whether the characteristic of the UE-to-UE CLI reference signal satisfies a threshold, wherein the information associated with the characteristic includes an indication of whether the characteristic satisfies the threshold.

7. The UE of claim 1, wherein, in association with measuring the characteristic of the UE-to-UE CLI reference signal, the UE is not expected to measure the characteristic with a subcarrier spacing (SCS) other than an SCS configured for an uplink SB including a UE-to-UE CLI reference signal resource on the network node SBFD symbol.

8. The UE of claim 1, wherein the characteristic of the UE-to-UE CLI reference signal is measured with a subcarrier spacing (SCS) configured for an uplink SB including a UE-to-UE CLI reference signal resource on the network node SBFD symbol.

9. The UE of claim 1, wherein, in association with measuring the characteristic of the UE-to-UE CLI reference signal, the UE is not expected to measure the characteristic of the UE-to-UE CLI reference signal using a measurement resource that is not confined within the uplink SB.

10. The UE of claim 1, wherein the characteristic of the UE-to-UE CLI reference signal is measured using a measurement resource that is confined within the uplink SB.

11. The UE of claim 1, wherein the one or more processors, to measure the characteristic of the UE-to-UE CLI reference signal in the uplink SB, are configured to:
    measure the characteristic of the UE-to-UE CLI reference signal in a plurality of sub-SBs of the uplink SB.

12. The UE of claim 1, wherein the configuration is associated with measuring the characteristic of the UE-to-UE CLI reference signal in the uplink SB.

13. A user equipment (UE) for wireless communication, comprising:
    one or more memories; and
    one or more processors, coupled to the one or more memories, configured to:
    receive a configuration associated with measuring or reporting a characteristic of a UE-to-UE cross link interference (CLI) reference signal, wherein the configuration indicates a symbol in which the characteristic is to be measured;

measure the characteristic of a UE-to-UE CLI reference signal in a first plurality of sub-sub-bands (sub-SBs) of the symbol, the first plurality of sub-SBs being included in a first SB of the symbol; and transmit a report including information associated with the characteristic of the UE-to-UE CLI reference signal.

14. The UE of claim 13, wherein the characteristic includes a reference signal received power (RSRP), a received signal strength indicator (RSSI), a signal-to-interference-plus-noise ratio (SINR), or some combination thereof.

15. The UE of claim 13, wherein the first plurality of sub-SBs includes a first edge sub-SB of the first SB, a central sub-SB of the first SB, and a second edge sub-SB of the first SB.

16. The UE of claim 13, wherein the first SB is an uplink SB.

17. The UE of claim 16, wherein the characteristic of the UE-to-UE CLI reference signal is measured in the uplink SB in association with detecting intra-SB CLI that affects a dynamic range of a receiver or causes automatic gain control (AGC) blocking of the receiver.

18. The UE of claim 13, wherein the first SB is a downlink SB.

19. The UE of claim 18, wherein the characteristic of the UE-to-UE CLI reference signal is measured in the downlink SB in association with detecting inter-SB leakage.

20. The UE of claim 13, wherein the symbol is a network node SB full-duplex (SBFD) symbol.

21. The UE of claim 13, wherein the symbol is configured as a sub-band full-duplex (SBFD) symbol and is a legacy downlink symbol or a legacy flexible symbol.

22. The UE of claim 13, wherein the one or more processors are further configured to measure a characteristic of the UE-to-UE CLI reference signal in a second plurality of sub-SBs of the symbol, the second plurality of sub-SBs being included in a second SB of the symbol, wherein the report further includes information associated with the characteristic of the UE-to-UE CLI reference signal in the second plurality of sub-SBs.

23. The UE of claim 22, wherein the first SB is an uplink SB of the symbol and the second SB is a downlink SB of the symbol.

24. The UE of claim 13, wherein the configuration is associated with measuring characteristic of the UE-to-UE CLI reference signal.

25. A network node for wireless communication, comprising:

one or more memories; and one or more processors, coupled to the one or more memories, configured to:

transmit, to a user equipment (UE), a configuration associated with measuring or reporting a characteristic of a UE-to-UE cross link interference (CLI) reference signal in an uplink sub-band (SB) of a network node sub-band full-duplex (SBFD) symbol, wherein the configuration indicates a symbol in which the characteristic is to be measured, and wherein the symbol comprises the network node SBFD symbol; and receive, from the UE, a report including information associated with the characteristic of the UE-to-UE CLI reference signal.

26. The network node of claim 25, wherein the characteristic includes a reference signal received power (RSRP), a received signal strength indicator (RSSI), or some combination thereof.

27. The network node of claim 25, wherein the information associated with the characteristic of the UE-to-UE CLI reference signal includes an indication of whether a blocker is present in the uplink SB.

28. A network node for wireless communication, comprising:

one or more memories; and one or more processors, coupled to the one or more memories, configured to:

transmit, to a user equipment (UE), a configuration associated with measuring or reporting a characteristic of a UE-to-UE cross link interference (CLI) reference signal in a first plurality of sub-sub-bands (sub-SBs) of a symbol, the first plurality of sub-SBs being included in a first SB of the symbol, wherein the configuration indicates the symbol; and receive a report including information associated with the characteristic of the UE-to-UE CLI reference signal.

29. The network node of claim 28, wherein the characteristic includes a reference signal received power (RSRP), a received signal strength indicator (RSSI), a signal-to-interference-plus-noise ratio (SINR), or some combination thereof.

30. The network node of claim 28, wherein the first plurality of sub-SBs includes a first edge sub-SB of the first SB, a central sub-SB of the first SB, and a second edge sub-SB of the first SB.

* * * * *